United States Patent
Avlas et al.

(10) Patent No.: US 11,971,507 B2
(45) Date of Patent: Apr. 30, 2024

(54) SYSTEMS AND METHODS FOR MITIGATING OPTICAL CROSSTALK IN A LIGHT RANGING AND DETECTION SYSTEM

(71) Applicant: VELODYNE LIDAR USA, INC., San Jose, CA (US)

(72) Inventors: Leon Nicolas Avlas, Los Gatos, CA (US); Eric Nathaniel Berseth, Santa Clara, CA (US)

(73) Assignee: VELODYNE LIDAR USA, INC., San Jose, CA (US)

( * ) Notice: Subject to any disclaimer, the term of this patent is extended or adjusted under 35 U.S.C. 154(b) by 637 days.

(21) Appl. No.: 16/112,273

(22) Filed: Aug. 24, 2018

(65) Prior Publication Data

US 2020/0064452 A1   Feb. 27, 2020

(51) Int. Cl.
*G01S 7/487* (2006.01)
*G01S 7/48* (2006.01)
*G01S 17/931* (2020.01)

(52) U.S. Cl.
CPC .......... *G01S 7/4876* (2013.01); *G01S 7/4804* (2013.01); *G01S 17/931* (2020.01)

(58) Field of Classification Search
CPC ...... G01S 7/4863; G01S 7/4816; G01S 7/484; G01S 17/10; G01S 17/87; G01S 17/931; G01S 7/486; G01S 17/894
See application file for complete search history.

(56) References Cited

U.S. PATENT DOCUMENTS

| 3,064,252 A | 11/1962 | Varela |
| 3,373,441 A | 3/1968 | Zadig |
| 3,551,845 A | 12/1970 | Zelina |

(Continued)

FOREIGN PATENT DOCUMENTS

| CN | 1643398 A | 7/2005 |
| CN | 104838284 A | 8/2015 |

(Continued)

OTHER PUBLICATIONS

U.S. Appl. No. 15/941,302, filed Mar. 30, 2018.

(Continued)

*Primary Examiner* — Luke D Ratcliffe
(74) *Attorney, Agent, or Firm* — Kilpatrick Townsend & Stockton LLP

(57) ABSTRACT

Described herein are systems and methods for improving detection of multi-return light signals, and more particularly to the mitigation of optical crosstalk in a Light Detection And Ranging (LIDAR) system. The methods may include cycling a passive state, where the LIDAR system receives returns from other optical sources, and in an active state, where the LIDAR system receives returns from its laser firing and from the other optical sources. By comparing the returns from the passive state and active state, crosstalk from the other optical sources may be removed. Other methods may include (1) phase locking intra LIDAR systems to fire their laser in different directions from one another; and (2) when two inter LIDAR system are firing a laser beam at one another within a field of view threshold, each inter LIDAR system may ignore the signal return from the other inter LIDAR system.

21 Claims, 14 Drawing Sheets

For LiDAR the light source is a laser

(56) References Cited

U.S. PATENT DOCUMENTS

| | | |
|---|---|---|
| 3,636,250 A | 1/1972 | Haeff |
| 3,686,514 A | 8/1972 | Dube et al. |
| 3,781,111 A | 12/1973 | Fletcher et al. |
| 3,862,415 A | 1/1975 | Harnden, Jr. et al. |
| 3,897,150 A | 7/1975 | Bridges et al. |
| 4,179,216 A | 12/1979 | Theurer et al. |
| 4,199,697 A | 4/1980 | Edwards |
| 4,201,442 A | 5/1980 | McMahon et al. |
| 4,212,534 A | 7/1980 | Bodlaj |
| 4,220,103 A | 9/1980 | Kasahara et al. |
| 4,477,184 A | 10/1984 | Endo |
| 4,516,837 A | 5/1985 | Soref et al. |
| 4,634,272 A | 1/1987 | Endo |
| 4,656,462 A | 4/1987 | Araki et al. |
| 4,681,433 A | 7/1987 | Aeschlimann |
| 4,700,301 A | 10/1987 | Dyke |
| 4,742,337 A | 5/1988 | Haag |
| 4,834,531 A | 5/1989 | Ward |
| 4,862,257 A | 8/1989 | Ulich |
| 4,895,440 A | 1/1990 | Cain et al. |
| 4,896,343 A | 1/1990 | Saunders |
| 4,902,126 A | 2/1990 | Koechner |
| 4,944,036 A | 7/1990 | Hyatt |
| 4,952,911 A | 8/1990 | D'Ambrosia et al. |
| 4,967,183 A | 10/1990 | D'Ambrosia et al. |
| 5,004,916 A | 4/1991 | Collins, Jr. |
| 5,006,721 A | 4/1991 | Cameron et al. |
| 5,023,888 A | 6/1991 | Bayston |
| 5,026,156 A | 6/1991 | Bayston et al. |
| 5,059,008 A | 10/1991 | Flood et al. |
| 5,175,694 A | 12/1992 | Amato |
| 5,177,768 A | 1/1993 | Crespo et al. |
| 5,210,586 A | 5/1993 | Grage et al. |
| 5,212,533 A | 5/1993 | Shibuya et al. |
| 5,241,481 A | 8/1993 | Olsen |
| 5,249,157 A | 9/1993 | Taylor |
| 5,291,261 A | 3/1994 | Dahl et al. |
| 5,309,212 A | 5/1994 | Clark |
| 5,314,037 A | 5/1994 | Shaw et al. |
| 5,319,201 A | 6/1994 | Lee |
| 5,365,218 A | 11/1994 | Otto |
| 5,463,384 A | 10/1995 | Juds |
| 5,465,142 A | 11/1995 | Krumes et al. |
| 5,515,156 A | 5/1996 | Yoshida et al. |
| 5,546,188 A | 8/1996 | Wangler et al. |
| 5,563,706 A | 10/1996 | Shibuya et al. |
| 5,572,219 A | 11/1996 | Silverstein et al. |
| 5,691,687 A | 11/1997 | Kumagai et al. |
| 5,710,417 A | 1/1998 | Joseph et al. |
| 5,757,472 A | 5/1998 | Wangler et al. |
| 5,757,501 A | 5/1998 | Hipp |
| 5,757,677 A | 5/1998 | Lennen |
| 5,789,739 A | 8/1998 | Schwarz |
| 5,793,163 A | 8/1998 | Okuda |
| 5,793,491 A | 8/1998 | Wangler et al. |
| 5,805,468 A | 9/1998 | Blohbaum |
| 5,847,817 A | 12/1998 | Zediker et al. |
| 5,877,688 A | 3/1999 | Morinaka et al. |
| 5,889,479 A | 3/1999 | Tabel |
| 5,895,984 A | 4/1999 | Renz |
| 5,903,355 A | 5/1999 | Schwarz |
| 5,903,386 A | 5/1999 | Mantravadi et al. |
| 5,923,910 A | 7/1999 | Nakahara et al. |
| 5,942,688 A | 8/1999 | Kimura et al. |
| 5,949,530 A | 9/1999 | Wetteborn |
| 5,953,110 A | 9/1999 | Burns |
| 5,991,011 A | 11/1999 | Damm |
| 6,034,803 A | 3/2000 | Sullivan et al. |
| 6,043,868 A | 3/2000 | Dunne |
| 6,069,565 A | 5/2000 | Stern et al. |
| 6,088,085 A | 7/2000 | Wetteborn |
| 6,100,539 A | 8/2000 | Blumcke et al. |
| 6,137,566 A | 10/2000 | Leonard et al. |
| 6,153,878 A | 11/2000 | Jakob et al. |
| 6,157,294 A | 12/2000 | Urai et al. |
| 6,201,236 B1 | 3/2001 | Juds |
| 6,259,714 B1 | 7/2001 | Kinbara |
| 6,297,844 B1 | 10/2001 | Schatz et al. |
| 6,321,172 B1 | 11/2001 | Jakob et al. |
| 6,327,806 B1 | 12/2001 | Paige |
| 6,329,800 B1 | 12/2001 | May |
| 6,335,789 B1 | 1/2002 | Kikuchi |
| 6,365,429 B1 | 4/2002 | Kneissl et al. |
| 6,396,577 B1 | 5/2002 | Ramstack |
| 6,420,698 B1 | 7/2002 | Dimsdale |
| 6,441,363 B1 | 8/2002 | Cook, Jr. et al. |
| 6,441,889 B1 | 8/2002 | Patterson |
| 6,442,476 B1 | 8/2002 | Poropat |
| 6,473,079 B1 | 10/2002 | Kacyra et al. |
| 6,504,712 B2 | 1/2003 | Hashimoto et al. |
| 6,509,958 B2 | 1/2003 | Pierenkemper |
| 6,593,582 B2 | 7/2003 | Lee et al. |
| 6,621,764 B1 | 9/2003 | Smith |
| 6,636,300 B2 | 10/2003 | Doemens et al. |
| 6,646,725 B1 | 11/2003 | Eichinger et al. |
| 6,650,402 B2 | 11/2003 | Sullivan et al. |
| 6,664,529 B2 | 12/2003 | Pack et al. |
| 6,665,063 B2 | 12/2003 | Jamieson et al. |
| 6,670,905 B1 | 12/2003 | Orr |
| 6,682,478 B2 | 1/2004 | Nakamura |
| 6,710,324 B2 | 3/2004 | Hipp |
| 6,742,707 B1 | 6/2004 | Tsikos et al. |
| 6,747,747 B2 | 6/2004 | Hipp |
| 6,759,649 B2 | 7/2004 | Hipp |
| 6,789,527 B2 | 9/2004 | Sauler et al. |
| 6,798,527 B2 | 9/2004 | Fukumoto et al. |
| 6,812,450 B2 | 11/2004 | Hipp |
| 6,876,790 B2 | 4/2005 | Lee |
| 6,879,419 B2 | 4/2005 | Richman et al. |
| 6,969,558 B2 | 11/2005 | Walston et al. |
| 7,030,968 B2 | 4/2006 | D'Aligny et al. |
| 7,041,962 B2 | 5/2006 | Dollmann et al. |
| 7,089,114 B1 | 8/2006 | Huang |
| 7,106,424 B2 | 9/2006 | Meneely et al. |
| 7,129,971 B2 | 10/2006 | McCutchen |
| 7,130,672 B2 | 10/2006 | Pewzner et al. |
| 7,131,586 B2 | 11/2006 | Tsikos et al. |
| 7,190,465 B2 | 3/2007 | Froehlich et al. |
| 7,240,314 B1 | 7/2007 | Leung |
| 7,248,342 B1 | 7/2007 | Degnan |
| 7,281,891 B2 | 10/2007 | Smith et al. |
| 7,295,298 B2 | 11/2007 | Willhoeft et al. |
| 7,313,424 B2 | 12/2007 | Mayevsky et al. |
| 7,315,377 B2 | 1/2008 | Holland et al. |
| 7,319,777 B2 | 1/2008 | Morcom |
| 7,345,271 B2 | 3/2008 | Boehlau et al. |
| 7,358,819 B2 | 4/2008 | Rollins |
| 7,373,473 B2 | 5/2008 | Bukowski et al. |
| 7,408,462 B2 | 8/2008 | Pirkl et al. |
| 7,480,031 B2 | 1/2009 | Mack |
| 7,544,945 B2 | 6/2009 | Tan et al. |
| 7,570,793 B2 | 8/2009 | Lages et al. |
| 7,583,364 B1 | 9/2009 | Mayor et al. |
| 7,589,826 B2 | 9/2009 | Mack et al. |
| 7,619,477 B2 | 11/2009 | Segarra |
| 7,623,222 B2 | 11/2009 | Benz et al. |
| 7,640,068 B2 | 12/2009 | Johnson et al. |
| 7,642,946 B2 | 1/2010 | Wong et al. |
| 7,684,590 B2 | 3/2010 | Kampchen et al. |
| 7,697,581 B2 | 4/2010 | Walsh et al. |
| 7,741,618 B2 | 6/2010 | Lee et al. |
| 7,746,271 B2 | 6/2010 | Furstenberg |
| 7,868,665 B2 | 1/2011 | Tumer et al. |
| 7,969,558 B2 | 6/2011 | Hall |
| 8,042,056 B2 | 10/2011 | Wheeler et al. |
| 8,077,047 B2 | 12/2011 | Humble et al. |
| 8,139,685 B2 | 3/2012 | Simic et al. |
| 8,203,702 B1 | 6/2012 | Kane et al. |
| 8,274,037 B2 | 9/2012 | Ritter et al. |
| 8,310,653 B2 | 11/2012 | Ogawa et al. |
| 8,605,262 B2 | 12/2013 | Campbell et al. |
| 8,675,181 B2 | 3/2014 | Hall |
| 8,736,818 B2 | 5/2014 | Weimer et al. |
| 8,767,190 B2 | 7/2014 | Hall |

(56) References Cited

U.S. PATENT DOCUMENTS

| | | |
|---|---|---|
| 8,976,340 B2 | 3/2015 | Gilliland et al. |
| 8,995,478 B1 | 3/2015 | Kobtsev et al. |
| 9,063,549 B1 | 6/2015 | Pennecot et al. |
| 9,069,061 B1 | 6/2015 | Harwit |
| 9,069,080 B2 | 6/2015 | Stettner et al. |
| 9,086,273 B1 | 7/2015 | Gruver et al. |
| 9,093,969 B2 | 7/2015 | Gebeyehu et al. |
| 9,110,154 B1 | 8/2015 | Bates et al. |
| 9,151,940 B2 | 10/2015 | Chuang et al. |
| 9,194,701 B2 | 11/2015 | Bosch |
| RE45,854 E | 1/2016 | Gittinger et al. |
| 9,239,959 B1 | 1/2016 | Evans et al. |
| 9,246,041 B1 | 1/2016 | Clausen et al. |
| 9,285,477 B1 | 3/2016 | Smith et al. |
| 9,286,538 B1 | 3/2016 | Chen et al. |
| 9,310,197 B2 | 4/2016 | Gogolla et al. |
| 9,383,753 B1 | 7/2016 | Templeton et al. |
| 9,453,914 B2 | 9/2016 | Stettner et al. |
| 9,529,079 B1 | 12/2016 | Droz et al. |
| 9,772,607 B2 | 9/2017 | Decoux et al. |
| 9,778,362 B2 | 10/2017 | Rondeau et al. |
| RE46,672 E | 1/2018 | Hall |
| 9,964,632 B1 | 5/2018 | Droz et al. |
| 9,983,297 B2 | 5/2018 | Hall et al. |
| 9,989,629 B1 | 6/2018 | LaChapelle |
| 10,003,168 B1 | 6/2018 | Villeneuve |
| 10,018,726 B2 | 7/2018 | Hall et al. |
| 10,048,374 B2 | 8/2018 | Hall et al. |
| 10,094,925 B1 | 10/2018 | LaChapelle |
| 10,109,183 B1 | 10/2018 | Franz et al. |
| 10,120,079 B2 | 11/2018 | Pennecot et al. |
| 10,126,412 B2 | 11/2018 | Eldada et al. |
| 10,132,928 B2 | 11/2018 | Eldada et al. |
| 10,309,213 B2 | 6/2019 | Barfoot et al. |
| 10,330,780 B2 | 6/2019 | Hall et al. |
| 10,386,465 B2 | 8/2019 | Hall et al. |
| 10,393,877 B2 | 8/2019 | Hall et al. |
| 10,436,904 B2 | 10/2019 | Moss et al. |
| 10,545,222 B2 | 1/2020 | Hall et al. |
| RE47,942 E | 4/2020 | Hall |
| 10,613,203 B1 | 4/2020 | Rekow et al. |
| 10,627,490 B2 | 4/2020 | Hall et al. |
| 10,627,491 B2 | 4/2020 | Hall et al. |
| 2001/0011289 A1 | 8/2001 | Davis et al. |
| 2001/0017718 A1 | 8/2001 | Ikeda et al. |
| 2002/0003617 A1 | 1/2002 | Doemens et al. |
| 2002/0060784 A1 | 5/2002 | Pack et al. |
| 2002/0117545 A1 | 8/2002 | Tsikos et al. |
| 2003/0041079 A1 | 2/2003 | Bellemore et al. |
| 2003/0043363 A1 | 3/2003 | Jamieson et al. |
| 2003/0043364 A1 | 3/2003 | Jamieson et al. |
| 2003/0057533 A1 | 3/2003 | Lemmi et al. |
| 2003/0066977 A1 | 4/2003 | Hipp et al. |
| 2003/0076485 A1 | 4/2003 | Ruff et al. |
| 2003/0090646 A1 | 5/2003 | Riegl et al. |
| 2003/0163030 A1 | 8/2003 | Arriaga |
| 2004/0021852 A1 | 2/2004 | DeFlumere |
| 2004/0066500 A1 | 4/2004 | Gokturk et al. |
| 2004/0134879 A1 | 7/2004 | Kochergin et al. |
| 2004/0150810 A1 | 8/2004 | Muenter et al. |
| 2004/0213463 A1 | 10/2004 | Morrison |
| 2004/0240706 A1 | 12/2004 | Wallace et al. |
| 2004/0240710 A1 | 12/2004 | Lages et al. |
| 2004/0247157 A1 | 12/2004 | Lages et al. |
| 2005/0023353 A1 | 2/2005 | Tsikos et al. |
| 2005/0168720 A1 | 8/2005 | Yamashita et al. |
| 2005/0211893 A1 | 9/2005 | Paschalidis |
| 2005/0232466 A1 | 10/2005 | Kampchen et al. |
| 2005/0246065 A1 | 11/2005 | Ricard |
| 2005/0248749 A1 | 11/2005 | Kiehn et al. |
| 2005/0279914 A1 | 12/2005 | Dimsdale et al. |
| 2006/0007350 A1 | 1/2006 | Gao et al. |
| 2006/0089765 A1 | 4/2006 | Pack et al. |
| 2006/0100783 A1 | 5/2006 | Haberer et al. |
| 2006/0115113 A1 | 6/2006 | Lages et al. |
| 2006/0132635 A1 | 6/2006 | Land |
| 2006/0176697 A1 | 8/2006 | Arruda |
| 2006/0186326 A1 | 8/2006 | Ito |
| 2006/0197867 A1 | 9/2006 | Johnson et al. |
| 2006/0231771 A1 | 10/2006 | Lee et al. |
| 2006/0290920 A1 | 12/2006 | Kampchen et al. |
| 2007/0035624 A1 | 2/2007 | Lubard et al. |
| 2007/0071056 A1 | 3/2007 | Chen |
| 2007/0121095 A1 | 5/2007 | Lewis |
| 2007/0181810 A1 | 8/2007 | Tan et al. |
| 2007/0201027 A1 | 8/2007 | Doushkina et al. |
| 2007/0219720 A1 | 9/2007 | Trepagnier et al. |
| 2007/0241955 A1 | 10/2007 | Brosche |
| 2007/0272841 A1 | 11/2007 | Wiklof |
| 2008/0002176 A1 | 1/2008 | Krasutsky |
| 2008/0013896 A1 | 1/2008 | Salzberg et al. |
| 2008/0074640 A1 | 3/2008 | Walsh et al. |
| 2008/0079371 A1 | 4/2008 | Kang et al. |
| 2008/0154495 A1 | 6/2008 | Breed |
| 2008/0170826 A1 | 7/2008 | Schaafsma |
| 2008/0186501 A1 | 8/2008 | Xie |
| 2009/0010644 A1 | 1/2009 | Varshneya et al. |
| 2009/0026503 A1 | 1/2009 | Tsuda |
| 2009/0085901 A1 | 4/2009 | Antony |
| 2009/0122295 A1 | 5/2009 | Eaton |
| 2009/0142053 A1 | 6/2009 | Varshneya et al. |
| 2009/0168045 A1 | 7/2009 | Lin et al. |
| 2009/0218475 A1 | 9/2009 | Kawakami et al. |
| 2009/0245788 A1 | 10/2009 | Varshneya et al. |
| 2009/0323737 A1 | 12/2009 | Ensher et al. |
| 2010/0006760 A1 | 1/2010 | Lee et al. |
| 2010/0020306 A1 | 1/2010 | Hall |
| 2010/0045965 A1 | 2/2010 | Meneely |
| 2010/0046953 A1 | 2/2010 | Shaw et al. |
| 2010/0134596 A1 | 6/2010 | Becker |
| 2010/0188722 A1 | 7/2010 | Yamada et al. |
| 2010/0198487 A1 | 8/2010 | Vollmer et al. |
| 2010/0204964 A1 | 8/2010 | Pack et al. |
| 2010/0239139 A1 | 9/2010 | Hunt et al. |
| 2010/0265077 A1 | 10/2010 | Humble et al. |
| 2010/0271615 A1 | 10/2010 | Sebastian et al. |
| 2010/0302528 A1 | 12/2010 | Hall |
| 2011/0028859 A1 | 2/2011 | Chian |
| 2011/0040482 A1 | 2/2011 | Brimble et al. |
| 2011/0211188 A1 | 9/2011 | Juenemann et al. |
| 2011/0216304 A1 | 9/2011 | Hall |
| 2011/0305250 A1 | 12/2011 | Chann et al. |
| 2012/0038903 A1 | 2/2012 | Weimer et al. |
| 2012/0195597 A1 | 8/2012 | Malaney |
| 2012/0287417 A1 | 11/2012 | Mimeault |
| 2013/0024176 A2 | 1/2013 | Woodford |
| 2013/0050144 A1 | 2/2013 | Reynolds |
| 2013/0050486 A1 | 2/2013 | Omer et al. |
| 2013/0070239 A1 | 3/2013 | Crawford et al. |
| 2013/0094960 A1 | 4/2013 | Bowyer et al. |
| 2013/0151198 A1 | 6/2013 | Brown |
| 2013/0168673 A1 | 7/2013 | Yu et al. |
| 2013/0206967 A1 | 8/2013 | Shpunt et al. |
| 2013/0241761 A1 | 9/2013 | Cooper et al. |
| 2013/0242283 A1 | 9/2013 | Bailey et al. |
| 2013/0258312 A1 | 10/2013 | Lewis |
| 2013/0286404 A1 | 10/2013 | Cenko et al. |
| 2013/0300479 A1 | 11/2013 | Thibault |
| 2013/0314711 A1 | 11/2013 | Cantin et al. |
| 2013/0336375 A1 | 12/2013 | Ranki et al. |
| 2013/0342366 A1 | 12/2013 | Kiefer et al. |
| 2014/0063483 A1 | 3/2014 | Li |
| 2014/0071234 A1 | 3/2014 | Millett |
| 2014/0078519 A1 | 3/2014 | Steffey et al. |
| 2014/0104592 A1 | 4/2014 | Tien et al. |
| 2014/0152975 A1* | 6/2014 | Ko .................. G01S 17/894 356/5.01 |
| 2014/0240317 A1 | 8/2014 | Go et al. |
| 2014/0240721 A1 | 8/2014 | Herschbach |
| 2014/0253369 A1 | 9/2014 | Kelley et al. |
| 2014/0267848 A1 | 9/2014 | Wu |
| 2014/0274093 A1 | 9/2014 | Abdelmonem |
| 2014/0347650 A1 | 11/2014 | Bosch |
| 2015/0015895 A1 | 1/2015 | Bridges et al. |

(56) References Cited

U.S. PATENT DOCUMENTS

| | | |
|---|---|---|
| 2015/0035437 A1 | 2/2015 | Panopoulos et al. |
| 2015/0055117 A1 | 2/2015 | Pennecot et al. |
| 2015/0101234 A1 | 4/2015 | Priest et al. |
| 2015/0116695 A1 | 4/2015 | Bartolome et al. |
| 2015/0131080 A1 | 5/2015 | Retterath et al. |
| 2015/0144806 A1 | 5/2015 | Jin et al. |
| 2015/0185325 A1 | 7/2015 | Park et al. |
| 2015/0202939 A1 | 7/2015 | Stettner et al. |
| 2015/0219765 A1 | 8/2015 | Mead et al. |
| 2015/0226853 A1 | 8/2015 | Seo et al. |
| 2015/0293224 A1 | 10/2015 | Eldada et al. |
| 2015/0293228 A1 | 10/2015 | Retterath et al. |
| 2015/0303216 A1 | 10/2015 | Tamaru |
| 2016/0003946 A1* | 1/2016 | Gilliland ............... G01S 17/894 356/5.01 |
| 2016/0009410 A1 | 1/2016 | Derenick et al. |
| 2016/0014309 A1 | 1/2016 | Ellison et al. |
| 2016/0021713 A1 | 1/2016 | Reed |
| 2016/0049058 A1 | 2/2016 | Allen et al. |
| 2016/0061935 A1* | 3/2016 | McCloskey ........... G01S 7/4008 342/82 |
| 2016/0117431 A1 | 4/2016 | Kim et al. |
| 2016/0161600 A1 | 6/2016 | Eldada et al. |
| 2016/0191173 A1 | 6/2016 | Malaney |
| 2016/0223674 A1* | 8/2016 | Imaki ...................... G01S 17/95 |
| 2016/0259038 A1 | 9/2016 | Retterath et al. |
| 2016/0300484 A1 | 10/2016 | Torbett |
| 2016/0306032 A1 | 10/2016 | Schwarz et al. |
| 2016/0313445 A1 | 10/2016 | Bailey et al. |
| 2016/0363659 A1 | 12/2016 | Mindell et al. |
| 2016/0365846 A1 | 12/2016 | Wyland |
| 2017/0146639 A1 | 5/2017 | Carothers |
| 2017/0146640 A1 | 5/2017 | Hall et al. |
| 2017/0153319 A1 | 6/2017 | Villeneuve et al. |
| 2017/0214861 A1 | 7/2017 | Rachlin et al. |
| 2017/0219695 A1 | 8/2017 | Hall et al. |
| 2017/0220876 A1 | 8/2017 | Gao et al. |
| 2017/0242102 A1 | 8/2017 | Dussan et al. |
| 2017/0242107 A1 | 8/2017 | Dussan et al. |
| 2017/0269198 A1 | 9/2017 | Hall et al. |
| 2017/0269209 A1 | 9/2017 | Hall et al. |
| 2017/0269215 A1 | 9/2017 | Hall et al. |
| 2017/0273161 A1 | 9/2017 | Nakamura |
| 2017/0299721 A1 | 10/2017 | Eichenholz et al. |
| 2017/0350983 A1 | 12/2017 | Hall et al. |
| 2018/0019155 A1 | 1/2018 | Tsang et al. |
| 2018/0058197 A1 | 3/2018 | Barfoot et al. |
| 2018/0059219 A1 | 3/2018 | Irish et al. |
| 2018/0074382 A1 | 3/2018 | Lee et al. |
| 2018/0100924 A1 | 4/2018 | Brinkmeyer |
| 2018/0106902 A1 | 4/2018 | Mase et al. |
| 2018/0168539 A1 | 6/2018 | Singh et al. |
| 2018/0267151 A1 | 9/2018 | Hall et al. |
| 2018/0275249 A1 | 9/2018 | Campbell et al. |
| 2018/0284227 A1 | 10/2018 | Hall et al. |
| 2018/0284274 A1 | 10/2018 | LaChapelle |
| 2018/0321360 A1 | 11/2018 | Hall et al. |
| 2018/0364098 A1 | 12/2018 | McDaniel et al. |
| 2019/0001442 A1 | 1/2019 | Unrath et al. |
| 2019/0011563 A1 | 1/2019 | Hall et al. |
| 2019/0056498 A1* | 2/2019 | Sonn ...................... G01S 17/931 |
| 2019/0178991 A1 | 6/2019 | Hall et al. |
| 2019/0339365 A1 | 11/2019 | Hall et al. |
| 2019/0361092 A1 | 11/2019 | Hall et al. |
| 2019/0369257 A1 | 12/2019 | Hall et al. |
| 2019/0369258 A1 | 12/2019 | Hall et al. |
| 2020/0064452 A1 | 2/2020 | Avlas et al. |
| 2020/0142070 A1 | 5/2020 | Hall et al. |
| 2020/0144971 A1 | 5/2020 | Pinto et al. |
| 2020/0166613 A1 | 5/2020 | Hall et al. |
| 2020/0191915 A1 | 6/2020 | Hall et al. |

FOREIGN PATENT DOCUMENTS

| | | |
|---|---|---|
| CN | 107110969 A | 8/2017 |
| CN | 207601310 U | 7/2018 |
| RU | 2554279 C2 | 6/2015 |
| RU | 2567469 C2 | 11/2015 |
| RU | 2575766 C1 | 2/2016 |
| TW | 201333512 A | 8/2013 |
| WO | WO-2017/149370 A1 | 9/2017 |

OTHER PUBLICATIONS

U.S. Appl. No. 16/510,680, filed Jul. 12, 2019, Hall et al.
U.S. Appl. No. 16/510,710, filed Jul. 12, 2019, Hall et al.
U.S. Appl. No. 16/510,749, filed Jul. 12, 2019, Hall et al.
U.S. Appl. No. 15/420,384, filed Jan. 31, 2017, Hall et al.
U.S. Appl. No. 16/030,780, filed Jul. 9, 2018, Hall et al.
U.S. Appl. No. 11/777,802, filed Jul. 13, 2007, Hall.
U.S. Appl. No. 13/109,901, filed May 17, 2011, Hall et al.
U.S. Appl. No. 15/180,580, filed Jun. 13, 2016, Hall et al.
U.S. Appl. No. 15/700,543, filed Sep. 11, 2017, Hall et al.
U.S. Appl. No. 15/700,558, filed Sep. 11, 2017, Hall et al.
U.S. Appl. No. 15/700,571, filed Sep. 11, 2017, Hall et al.
U.S. Appl. No. 15/700,836, filed Sep. 11, 2017, Hall et al.
U.S. Appl. No. 15/700,844, filed Sep. 11, 2017, Hall et al.
U.S. Appl. No. 15/700,959, filed Sep. 11, 2017, Hall et al.
U.S. Appl. No. 15/700,965, filed Sep. 11, 2017, Hall et al.
U.S. Appl. No. 16/912,648, filed Jun. 25, 2020, Hall et al.
U.S. Appl. No. 15/926,095, filed Mar. 30, 2018, Hall et al.
U.S. Appl. No. 15/464,227, filed Mar. 30, 2017, Hall et al.
U.S. Appl. No. 15/464,221, filed Mar. 30, 2017, Hall et al.
U.S. Appl. No. 15/974,527, filed May 8, 2018, Hall et al.
U.S. Appl. No. 16/748,498, filed Jan. 21, 2020, Hall et al.
U.S. Appl. No. 15/610,975, filed Jun. 1, 2017, Hall et al.
U.S. Appl. No. 16/546,131, filed Aug. 20, 2019, Hall et al.
U.S. Appl. No. 16/842,491, filed Apr. 7, 2020, Hall et al.
U.S. Appl. No. 16/546,184, filed Aug. 20, 2019, Hall et al.
U.S. Appl. No. 16/546,206, filed Aug. 20, 2019, Hall et al.
U.S. Appl. No. 16/909,306, filed Jun. 23, 2020, Hall et al.
U.S. Appl. No. 15/339,790, filed Oct. 31, 2016, Hall et al.
U.S. Appl. No. 16/854,755, filed Apr. 21, 2020, Hall et al.
U.S. Appl. No. 16/905,843, filed Jun. 18, 2020, Hall et al.
U.S. Appl. No. 16/905,849, filed Jun. 18, 2020, Hall et al.
U.S. Appl. No. 16/909,846, filed Jun. 23, 2020, Hall et al.
U.S. Appl. No. 15/835,983, filed Dec. 8, 2017, Hall et al.
U.S. Appl. No. 16/459,557, filed Jul. 1, 2019, Rekow et al.
U.S. Appl. No. 16/841,506, filed Apr. 6, 2020, Rekow et al.
U.S. Appl. No. 16/181,523, filed Nov. 6, 2018, Pinto et al.
U.S. Appl. No. 16/241,849, filed Jan. 7, 2019, Hall et al.
U.S. Appl. No. 16/241,963, filed Jan. 7, 2019, Hall et al.
*Quanergy Systems, Inc.* v. *Velodyne Lidar, Inc.* (N.D. Cal.), Docket No. 5:16-cv-05251, filed Sep. 13, 2016, U.S. Pat. No. 7,969,558.
*Velodyne Lidar, Inc.* v. *Hesai Photonics Technology Co., Ltd.* (N.D. Cal.), Docket No. 5:16-cv-04742, filed Aug. 13, 2019, U.S. Pat. No. 7,969,558.
*Velodyne Lidar, Inc.* v. *Suteng Innovation Technology Co., Ltd.* (N.D. Cal.), Docket No. 5:16-cv-04746, filed Aug. 13, 2019, U.S. Pat. No. 7,969,558.
In re Certain Rotating 3-D Lidar Devices, Components Thereof, and Sensing Systems Containing the Same (ITC), Investigation No. ITC-337-TA-1173, filed Aug. 15, 2019, U.S. Pat. No. 7,969,558.
Petition for Inter Partes Review (USPTO Patent Trial and Appeal Board), Case No. IPR2018-00255, filed Nov. 29, 2017, U.S. Pat. No. 7,969,558.
Petition for Inter Partes Review (USPTO Patent Trial and Appeal Board), Case No. IPR2018-000255, filed Nov. 29, 2017, U.S. Pat. No. 7,969,558.
Inter Parties Review Petition for Inter Partes Review of U.S. Pat. No. 7,969,558 (Claims 1-4, 8, and 9) (IPR No. 2018-00255, *Quanergy Systems, Inc.* v. *Velodyne Lidar, Inc.*) (Nov. 29, 2017), 67 pages. (IPR No. 2018-00255).

(56) References Cited

OTHER PUBLICATIONS

Inter Parties Review Replacement Petition for Inter Partes Review of U.S. Pat. No. 7,969,558 (Claims 1-4, 8, and 9), 71 pages. (IPR No. 2018-00255).
Inter Parties Review Patent Owner's Preliminary Response (Public Version—Redacted) (dated Mar. 7, 2018), 72 pages. (IPR No. 2018-00255).
Inter Parties Review Decision: Institution of Inter Partes Review (May 25, 2018), 11 pages. (IPR No. 2018-00255).
Inter Parties Review Petitioner's Motion to Submit Supplemental Information Pursuant to 37 C.F.R. § 42.123(b) (Aug. 6, 2018), 16 pages. (IPR No. 2018-00255).
Inter Parties Review Decision: Petitioner's Motion to Submit Supplemental Information Pursuant to 37 C.F.R. § 42.123(b) (Aug. 8, 2018), 4 pages. (IPR No. 2018-00255).
Inter Parties Review Patent Owner's Response (Public Version—Redacted) (dated Sep. 28, 2018), 92 pages. (IPR No. 2018-00255).
Inter Parties Review Patent Owner's Contingent Motion to Amend (Public Version—Redacted) (Sep. 28, 2018), 56 pages. (IPR No. 2018-00255).
Inter Parties Review Petitioner's Unopposed Motion to Submit Replacement Petition and Supplemental Declaration (Nov. 5, 2018), 9 pages. (IPR No. 2018-00255).
Inter Parties Review Petitioner's Reply to Patent Owner's Response (dated Dec. 21, 2018), 38 pages. (IPR No. 2018-00255).
Inter Parties Review Petitioner Quanergy's Opposition to Patent Owner's Contingent Motion to Amend (Dec. 21, 2018), 35 pages. (IPR No. 2018-00255).
Inter Parties Review Patent Owner's Surreply (Jan. 16, 2019), 50 pages. (IPR No. 2018-00255).
Inter Parties Review Patent Owner's Reply in Support of Its Contingent Motion to Amend (Jan. 16, 2019), 33 pages. (IPR No. 2018-00255).
Inter Parties Review Petitioner Quanergy's Sur-Surreply (Jan. 30, 2019), 9 pages. (IPR No. 2018-00255).
Inter Parties Review Petitioner Quanergy's Surreply to Patent Owner's Contingent Motion to Amend (Jan. 30, 2019), 17 pages. (IPR No. 2018-00255).
Inter Parties Review Petitioner's Updated Exhibit List (Jan. 30, 2019), 13 pages. (IPR No. 2018-00255).
Inter Parties Review Patent Owner's Updated Exhibit List (Feb. 11, 2019), 21 pages. (IPR No. 2018-00255).
Inter Parties Review Record of Oral Hearing (Feb. 27, 2019), 126 pages. (IPR Nos. 2018-00255 and 2018-00256).
Inter Parties Review Final Written Decision (dated May 23, 2019), 40 pages. (IPR No. 2018-00255).
Inter Parties Review Petitioner's Request for Rehearing (Jun. 24, 2019), 20 pages. (IPR No. 2018-00255).
Inter Parties Review Decision Denying Petitioner's Request for Rehearing (May 21, 2020), 26 pages. (IPR No. 2018-00255).
Inter Parties Review Declaration of Dr. James F. Brennan III (Nov. 29, 2017), 172 pages. (IPR Nos. '255 and '256 Exhibit 1002).
Kilpelä, "Precise pulsed time-of-flight laser range finder for industrial distance measurements," Review of Scientific Instruments (Apr. 2001), 13 pages. (IPR Nos. '255 and '256 Exhibit 1005).
Bordone, et al., "Development of a high-resolution laser radar for 3D imaging in artwork cataloging," Proceedings of SPIE, vol. 5131 (2003), 6 pages. (IPR Nos. '255 and '256 Exhibit 1016).
The American Heritage Dictionary of the English Language, Houghton Mifflin Company, 3d ed. (1996), pp. 1497, 1570, 1697, 1762, and 1804. (IPR Nos. '255 and '256 Exhibit 1018).
Avalanche Photodiode: A User Guide (2011), 8 pages. (IPR Nos. '255 and '256 Exhibit 1019).
Melle, et al., "How to select avalanche photodiodes," Laser Focus World (Oct. 1, 1995), 9 pages. (IPR Nos. '255 and '256 Exhibit 1020).
Aull, et al., "Geiger-Mode Avalanche Photodiodes for Three Dimensional Imaging," Lincoln Laboratory Journal (2002), 16 p. (IPR Nos. '255 and '256 Exhibit 1021), Lincoln Laboratory Journal, vol. 13, No. 2, 2002, pp. 335-350.
Wikipedia, "Laser" (Nov. 10, 2017), 25 pages. (IPR Nos. '255 and '256 Exhibit 1022).
Internet Archive Web Page: Laser Components (2004), 1 page. (IPR Nos. '255 and '256 Exhibit 1023).
Internet Archive Web Page: Laser Components: High Powered Pulsed Laser Diodes 905D3J08-Series (2004), 6 pages. (IPR Nos. '255 and '256 Exhibit 1024).
U.S. District Court, Claim Construction Order, *Quanergy Systems, Inc.* v. *Velodyne LiDAR, Inc.*, Case No. 5:16-cv-5251-EJD (Oct. 4, 2017), 33 pages. (IPR Nos. '255 and '256 Exhibit 1027).
Internet Archive Webpage: Mercotac 3-Conductor Rotary Electrical Connectors (Mar. 2006), 1 page. (IPR Nos. '255 and '256 Exhibit 1031).
Aood Technology Limited, "Electrical Slip Rings vs. Rotating Electrical Connectors" (2013), 3 pages. (IPR Nos. '255 and '256 Exhibit 1032).
Yang, et al., "Performance of a large-area avalanche photodiode at low temperature for scintillation detection," Nuclear Instruments and Methods in Physics Research (2003), pp. 388-393 (IPR Nos. '255 and '256 Exhibit 1034).
Thomas, "A procedure for multiple-pulse maximum permissible exposure determination under the Z136.1-2000 American national standard for safe use of lasers," Journal of Laser Applications, Aug. 2001, vol. 13, No. 4, pp. 134-140.
American National Standards Institute, "Procedures for the Development and Coordination of American National Standards" (Mar. 22, 1995), 50 pages. (IPR Nos. '255 and '256 Exhibit 1040).
Inter Parties Review, Declaration of Dr. Sylvia Hall-Ellis (Nov. 29, 2017), 93 pages. (IPR Nos. '255 and '256 Exhibit 1041).
Ogurtsov, et al., "High Accuracy ranging with Yb3+-doped fiber-ring frequency-shifted feedback laser with phase-modulated seed," Optics Communications (2006), pp. 266-273. (IPR Nos. '255 and '256 Exhibit 1042).
Ou-Yang, et al., "High-dynamic-range laser range finders based on a novel multimodulated frequency method," Optical Engineering (Dec. 2006), 6 pages. (IPR Nos. '255 and '256 Exhibit 1043).
Tarakanov, et al., "Picosecond pulse generation by internal gain switching in laser diodes," Journal of Applied Physics 95:223 (Mar. 2004), pp. 2223-2229. (IPR Nos. '255 and '256 Exhibit 1044).
Japanese Patent Office, Petitioner's Translation of Mizuno Japanese Patent Publication No. H3-6407 (1991), 15 pages. (IPR Nos. '255 and '256 Exhibit 1058).
Inter Parties Review, Redlined Supplemental Declaration of Dr. James F. Brennan III (2018), 171 pages. (IPR Nos. '255 and '256 Exhibit 1062).
Inter Parties Review, Declaration of James F. Brennan, III in Support of Petitioner's Replies and Oppositions to Motions to Amend (Dec. 21, 2018), 93 pages. (IPR Nos. '255 and '256 Exhibit 1063).
Inter Parties Review, Deposition Transcript of J. Gary Eden, Ph.D (taken Nov. 27, 2018), 285 pages. (IPR Nos. '255 and '256 Exhibit 1064).
Inter Parties Review, Declaration of Sylvia Hall-Ellis (Dec. 21, 2018), 146 pages. (IPR Nos. '255 and '256 Exhibit 1065).
Inter Parties Review, Chris Butler Affidavit and Exhibit (Dec. 18, 2018), 33 pages. (IPR Nos. '255 and '256 Exhibit 1066).
Inter Parties Review, Chris Butler Affidavit and Exhibit (Dec. 20, 2018), 52 pages. (IPR Nos. '255 and '256 Exhibit 1067).
Robots for Roboticists, LiDAR Fundamentals, http://robotsforroboticists.com/lidar-fundamentals/ (May 5, 2014), 6 pages. (IPR Nos. '255 and '256 Exhibit 1068).
Alhashimi, et al, Statistical Modeling and Calibration of Triangulation Lidars, Scitepress—Science and Technology Publications (2016), pp. 308-317. (IPR Nos. '255 and '256 Exhibit 1069).
USGS, EROS CalVal Center of Excellence (ECCOE), https://calval.cr.usgs.gov/wordpress/wpcontent/uploads/JACIE_files/JACIE06/Files/312Habib.pdf (Dec. 21, 2018), 3 pages. (IPR Nos. '255 and '256 Exhibit 1071).
Merriam, How to Use Lidar with the raspberry PI, Hackaday, https://hackaday.com/2016/01/22/how-to-use-lidar-with-the-raspberry-pi/ (Jan. 22, 2016), 13 pages. (IPR Nos. '255 and '256 Exhibit 1072).

(56) References Cited

OTHER PUBLICATIONS

Acuity Laser, Principles of Measurement Used by Laser Sensors, https://www.acuitylaser.com/measurement-principles (2018), 4 pages. (IPR Nos. '255 and '256 Exhibit 1075).

Inter Parties Review, Listing of Labelled Substitute Claims (2018), 17 pages. (IPR Nos. '255 and '256 Exhibit 1076).

Fuerstenberg, et al., Multilayer Laserscanner for Robust Object Tracking and Classification in Urban Traffic Scenes, 9th World Congress on Intelligent Transport Systems (2002), 14 pages. (IPR Nos. '255 and '256 Exhibit 1079), pp. 1-10.

Janocha, Actuators: Basics and Applications, Springer (2004), pp. 85-153. (IPR Nos. '255 and '256 Exhibit 1080).

Sick, Sick ToF sensors at close range, https://web.archive.org/web/20040607070720/http:/www.sick.de:80/de/products/categories/industrial/distancesensors/dme2000/en.html (Jun. 7, 2004), 2 pages. (IPR Nos. '255 and '256 Exhibit 1082).

Daido, Daido steel drilling equipment page, https://web.archive.org/web/20050406120958/http:/www.daido.co.jp:80/english/products/applipro/energy/dri.html (Apr. 6, 2005), 1 page. (IPR Nos. '255 and '256 Exhibit 1083).

Daido, Daido steel petroleum components, https://web.archive.org/web/20050406121643/http:/www.daido.co.jp:80/english/products/applipro/energy/petro.htm (Apr. 6, 2005), 1 page. (IPR Nos. '255 and '256 Exhibit 1084).

Daido, Daido steel rebar page, https://web.archive.org/web/20051201010951/http:/www.daido.co.jp:80/products/stainless/ik_shokai.html (Dec. 1, 2005), 2 pages. (IPR Nos. '255 and '256 Exhibit 1086).

Daido, Daido Special Steel Co. home page, https://web.archive.org/web/20051227070229/http:/daido.co.jp/ (Dec. 27, 2005), 1 page. (IPR Nos. '255 and '256 Exhibit 1087).

Canbus, https://web.archive.org/web/20040520021138/http:/canbus.us:80/ (May 20, 2004), 3 pages. (IPR Nos. '255 and '256 Exhibit 1088).

Esacademy, Betting on CAN, https://web.archive.org/web/20040609170940/http:/www.esacademy.com:80/faq/docs/bettingcan/traditional.htm (Jun. 9, 2004), 1 page. (IPR Nos. '255 and '256 Exhibit 1089).

Velodyne, Velodyne HDL-64E user manual, https://web.archive.org/web/20081117092628/http://www.velodyne.com/lidar/products/manual/HDL-64E%20Manual.pdf (Nov. 17, 2008), 23 pages. (IPR Nos. '255 and '256 Exhibit 1090).

Velodyne, Velodyne—High Definition Lidar—Overview https://web.archive.org/web/20071107104255/http://www.velodyne.com:80/lidar/products/overview.aspx (Nov. 7, 2007), 1 page. (IPR Nos. '255 and '256 Exhibit 1091).

DARPA, 2005 DARPA Challenge Info page https://web.archive.org/web/20051214033009/http:/www.darpa.mil:80/grandchallenge/ (Nov. 17, 2005), 1 page. (IPR Nos. '255 and '256 Exhibit 1092).

DARPA, 2005 DARPA Team Papers https://web.archive.org/web/20051213010211/http:/www.darpa.mil:80/grandchallenge/techpapers.html (Dec. 13, 2005), 2 pages. (IPR Nos. '255 and '256 Exhibit 1093).

DARPA, PDF found on Team DAD paper URL, https://web.archive.org/web/20051213015642/http:/www.darpa.mil:80/grandchallenge/TechPapers/TeamDAD.pdf (Aug. 6, 2005), pp. 1-12. (IPR Nos. '255 and '256 Exhibit 1094).

IBEO, IBEO time of flight with moving graphic, (Jan. 8, 2004), 1 page. (IPR Nos. '255 and '256 Exhibit 1095).

IBEO, IBEO multilayer technology page with moving graphic, Archive.org (Jan. 8, 2004), 1 page. (IPR Nos. '255 and '256 Exhibit 1096).

IBEO, IBEO multilayer tech, (Jan. 8, 2004), 1 page. (IPR Nos. '255 and '256 Exhibit 1097).

IBEO, IBEO Time of Flight, (Jan. 8, 2004), 1 page. (IPR Nos. '255 and '256 Exhibit 1098).

IBEO, IBEO Alasca, https://web.archive.org/web/20031001091407/http:/www.ibeoas.de:80/html/prod/prod_alasca.html (Oct. 1, 2003), 1 page. (IPR Nos. '255 and '256 Exhibit 1099).

IBEO, IBEO products page, https://web.archive.org/web/20040606115118/http:/www.ibeoas.de:80/html/prod/prod.html (Jun. 6, 2004), 1 page. (IPR Nos. '255 and '256 Exhibit 1100).

IBEO, IBEO multitarget capability, https://web.archive.org/web/20040323030746/http:/www.ibeoas.de:80/html/knho/knho_senstech_mlc.html (Mar. 23, 2004), 1 page. (IPR Nos. '255 and '256 Exhibit 1101).

IBEO, IBEO home page, https://web.archive.org/web/20040202131331/http:/www.ibeo-as.de:8 (Feb. 2, 2004), 1 page. (IPR Nos. '255 and '256 Exhibit 1102).

IBEO, IBEO about page, https://web.archive.org/web/20040606111631/http:/www.ibeoas.de:80/html/about/about (Jun. 6, 2004), 1 page. (IPR Nos. '255 and '256 Exhibit 1103).

IBEO, IBEO history, https://web.archive.org/web/20040807161657/http:/www.ibeoas.de:80/html/about/ab_history.html (Aug. 7, 2004), 1 page. (IPR Nos. '255 and '256 Exhibit 1104).

IBEO, IBEO Roadmap, https://web.archive.org/web/20041209032449/http:/www.ibeoas.de:80/html/prod/prod_roadmap.html (Dec. 9, 2004), 1 page. (IPR Nos. '255 and '256 Exhibit 1105).

Velodyne, Velodyne HDL Applications, https://web.archive.org/web/20080716041931/ http://www.velodyne.com:80/lidar/technology/applications.aspx (Jul. 16, 2008), 1 page. (IPR Nos. '255 and '256 Exhibit 1106).

IBEO, IBEO data sheet re available products, https://web.archive.org/web/20041209025137/ http://www.ibeoas.de:80/html/prod/prod_dataprices.html (Dec. 9, 2004), 2 pages. (IPR Nos. '255 and '256 Exhibit 1107).

IBEO, IBEO Available products, https://web.archive.org/web/20041011011528/ http://www.ibeoas.de:80/html/prod/prod.html (Oct. 11, 2004), 1 page. (IPR Nos. '255 and '256 Exhibit 1108).

IBEO, IBEO publications page, https://web.archive.org/web/20031208175052/ http://www.ibeoas.de:80/html/public/public.html (Dec. 8, 2003), 2 pages. (IPR Nos. '255 and '256 Exhibit 1109).

IBEO, IBEO Motiv sensor, https://web.archive.org/web/20040113062910/ http://www.ibeoas.de:80/html/rd/rd_rs_motiv.htm (Jan. 13, 2004), 1 page. (IPR Nos. '255 and '256 Exhibit 1110).

IBEO, IBEO LD Multilayer data sheet, https://web.archive.org/web/20031003201743/ http://www.ibeoas.de:80/html/prod/prod_Id_multi.html (Oct. 3, 2003), 1 page. (IPR Nos. '255 and '256 Exhibit 1111).

Velodynelidar, Data to Improve the Cost, Convenience and Safety of Motor Vehicles, https://velodynelidar.com/industry.html (2018), 6 pages. (IPR Nos. '255 and '256 Exhibit 1125).

Inter Parties Review, Quanergy Systems Inc.'s Invalidity Contentions and Production of Documents Pursuant to Patent Local Rules 3-3 and 3-4, *Quanergy Systems, Inc.* v. *Velodyne LiDAR, Inc.*, Case No. 5:16-cv-5251-EJD (Mar. 27, 2017), 24 pages. (IPR Nos. '255 and '256 Exhibit 1126).

Inter Parties Review, Quanergy Invalidity Contentions Claim Chart, U.S. Pat. No. 7,969,558 (Mizuno), *Quanergy Systems, Inc.* v. *Velodyne LiDAR, Inc.*, Case No. 5:16-cv-5251-EJD (Mar. 27, 2017), 17 pages. (IPR Nos. '255 and '256 Exhibit 1127).

Inter Parties Review, Quanergy Invalidity Contentions Claim Chart, U.S. Pat. No. 7,969,558 (PILAR), *Quanergy Systems, Inc.* v. *Velodyne LiDAR, Inc.*, Case No. 5:16-cv-5251-EJD (Mar. 27, 2017), 13 pages. (IPR Nos. '255 and '256 Exhibit 1128).

Richmond et al., Polarimetric Imaging Laser Radar (PILAR) Program. In Advanced Sensory Payloads for UAV, Meeting Proceedings RTO-MP-SET-092, Paper 19. Neuilly-sur-seine, France: RTO (May 1, 2005), 35 pages. (IPR Nos. '255 and '256 Exhibit 1129).

Frost et al., Driving the Future of Autonomous Navigation—Whitepaper for Analysis of LiDAR technology for advanced safety, https://velodynelidar.com/docs/papers/FROST-ON-LiDAR.pdf (2016), 30 pages. (IPR Nos. '255 and '256 Exhibit 1130).

irdajp.org, IrDA Infrared Data Association, http://www.irdajp.org/irdajp.info (2018), 3 pages. (IPR Nos. '255 and '256 Exhibit 1134).

Zappa, et al., SPADA: Single-Photon Avalanche Diode Arrays, IEEE Photonics Technology Letters, vol. 17, No. 3 (Mar. 2005), 9 pages. (IPR Nos. '255 and '256 Exhibit 1135).

Dehong, et al., Design and Implementation of LiDAR Navigation System Based on Triangulation Measurement, 29th Chinese Control and Decision Conference (CCDC) (May 2017), 59 pages. (IPR Nos. '255 and '256 Exhibit 1136).

(56) References Cited

OTHER PUBLICATIONS strata-gee.com, Velodyne President Calls Strata-gee to Set the Record Straight, https://www.strata-gee.com/velodyne-president-calls-strata-gee-setrecord-straight/ (Jun. 26, 2014), 6 pages. (IPR Nos. '255 and '256 Exhibit 1137).
Taylor, An Introduction to Error Analysis—The Study of Uncertainties in Physical Measurements, Oxford University Press (1982), pp. 81-137. (IPR Nos. '255 and '256 Exhibit 1138).
American Petroleum Institute, "Specification for Line Pipe," API Specification 5L, 43rd Ed. (2004), 166 pages. (IPR Nos. '255 and '256 Exhibit 1139).
Beer, et al., Mechanics of Materials, McGraw Hill Companies, 4th Ed. (2006), pp. 750 and 752. (IPR Nos. '255 and '256 Exhibit 1140).
National Highway Traffic Safety Administration (NHTSA), DOT, Final Rule Federal Motor Vehicle Safety Standards; Tire Pressure Monitoring Systems Controls and Displays (2005), 222 pages. (IPR Nos. '255 and '256 Exhibit 1141).
American National Standard for Safe Use of Lasers, ANSI Z136. Jan. 2014, Laser Institute of America (Dec. 10, 2013), pp. 27-34 and 216-219. (IPR Nos. '255 and '256 Exhibit 1142).
Business Wire, Press Release Distribution webpage, https://services.businesswire.com/press-release-distribution (Dec. 21, 2018), 2 pages. (IPR Nos. '255 and '256 Exhibit 1143).
Inter Parties Review, Deposition Transcript of J. Gary Eden, Ph.D (taken on Jan. 22, 2019), 368 pages. (IPR Nos. '255 and '256 Exhibit 1150).
Inter Parties Review, Eden Deposition Exhibit 1—Unmanned Vehicles Come of Age: The DARPA Grand Challenge (2006), pp. 26-29. (IPR Nos. '255 and '256 Exhibit 1151).
Inter Parties Review, Eden Deposition Exhibit 2—Driver Reaction Time in Crash Avoidance Research: validation of a Driving Simulator Study on a Test Track; Article in Human Factors and Ergonomics Society Annual Meeting Proceedings, Jul. 2000, 5 pages. (IPR Nos. '255 and '256 Exhibit 1152).
Inter Parties Review, Eden Deposition Exhibit 3—Axis of Rotation diagram (Jan. 22, 2019), 1 page. (IPR Nos. '255 and '256 Exhibit 1153).
Inter Parties Review, Eden Deposition Exhibit 4—Parallel Line and Plane—from Wolfram MathWorld (http://mathworld.wolfram.com/ParallelLineandPlane.html) (Jan. 22, 2019), 1 page. (IPR Nos. '255 and '256 Exhibit 1154).
Inter Parties Review, Eden Deposition Exhibit 5—Quasi-3D Scanning with Laserscanners: Introduction from 2D to 3D (2001), 7 pages. (IPR Nos. '255 and '256 Exhibit 1155).
Inter Parties Review, Eden Deposition Exhibit 6—L-Gage LT3 Long-Range Time-of-Flight Laser Distance-Gauging Sensors (2002), 12 pages. (IPR Nos. '255 and '256 Exhibit 1156).
Inter Parties Review, Eden Deposition Exhibit 7—About Ibeo: Our Mission (https://www.ibeoas.com/aboutibeo) (Jan. 21, 2019), 10 pages. (IPR Nos. '255 and '256 Exhibit 1157).
Inter Parties Review, Eden Deposition Exhibit 8—Automotive Industry; Explore Our Key Industries (https://velodynelidar.com/industry.html) (2019), 6 pages. (IPR Nos. '255 and '256 Exhibit 1158).
Inter Parties Review, Eden Deposition Exhibit 9—Leddar Tech, Solid-State LiDARs: Enabling the Automotive Industry Towards Autonomous Driving (2018), 6 pages. (IPR Nos. '255 and '256 Exhibit 1159).
Inter Parties Review, Eden Deposition Exhibit 10—Are processor algorithms key to safe self-driving cars?—EDN Asia (https: //www.ednasia.com/ news /article/areprocessor-algorithms-key-to-safe-self-driving-cars) (Jul. 7, 2016), 7 pages. (IPR Nos. '255 and '256 Exhibit 1160).
Inter Parties Review, Eden Deposition Exhibit 11—Steve Taranovich's profile (https://www.edn.com/user/steve.taranovich) (Jan. 22, 2019), 4 pages. (IPR Nos. '255 and '256 Exhibit 1161).
Inter Parties Review, Eden Deposition Exhibit 12—Instrumentation and Control (http://www.Instrumentation.co.za /article.aspx?pklarticleid=1664) (Feb. 2002), 4 pages. (IPR Nos. '255 and '256 Exhibit 1162).
Inter Parties Review, Eden Deposition Exhibit 13—IBEO on board: ibeo LUX 4L / ibeo LUX 8L / ibeo LUX HD Data Sheet (Jul. 2017), 2 pages. (IPR Nos. '255 and '256 Exhibit 1163).
Inter Parties Review, Quanergy's Objected-to Demonstrative Slides of Patent Owner (2019), 16 pages. (IPR Nos. '255 and '256 Exhibit 1164).
Inter Parties Review, Declaration of J. Gary Eden, Ph.D. in Support of Patent Owner's Preliminary Responses (Public Version—Redacted) (dated Mar. 7, 2018), 120 pages. (IPR Nos. '255 and '256 Exhibit 2003).
American National Standard for Safe Use of Lasers, Laser Institute of America (Jun. 28, 2000), 184 pages. (IPR Nos. '255 and '256 Exhibit 2005).
Hamatsu, Opto-Semiconductor Handbook, SI APD, MMPC (Chapter 3), ("APD Handbook"), available at https://www.hamamatsu.com/us/en/hamamatsu/overview/bsd/solid_state_division/related_documents.html (2014), 25 pages. (IPR Nos. '255 and '256 Exhibit 2006).
Berkovic et al., Optical Methods for Distance and Displacement Measurements, Advances in Optics and Photonics (Sep. 11, 2012), pp. 441-471. (IPR Nos. '255 and '256 Exhibit 2007).
Inter Parties Review, Excerpt from Stephan Lugomer, Laser Technology, Laser Driven Processes, Prentice-Hall (1990), pp. 302-311. (IPR Nos. '255 and '256 Exhibit 2008).
Inter Parties Review, Excerpt from James T. Luxon and David E. Parker, Industrial Lasers and Their Applications, Prentice-Hall (1985), pp. 56, 68-70, 124-125, 145, 150-151, and 154-159. (IPR Nos. '255 and '256 Exhibit 2009).
Inter Parties Review, Excerpt from Raymond T. Measures, Laser Remote Sensing, Fundamentals and Applications (1992), pp. 205 and 213-214. (IPR Nos. '255 and '256 Exhibit 2010).
Inter Parties Review, Excerpt from Peter W. Milonni and Joseph Eberly, Lasers (1988), pp. 585-589. (IPR Nos. '255 and '256 Exhibit 2011).
Inter Parties Review, Excerpt from William V. Smith, Laser Applications (1970), pp. 23-27. (IPR Nos. '255 and '256 Exhibit 2012).
Velodyne LiDAR, Webserver User Guide VLP-16 & HDL-32E (63-6266 Rev A) (Nov. 2015), 32 pages. (IPR Nos. '255 and '256 Exhibit 2013).
Inter Parties Review, Excerpt from Beautiful Data, Edited by Toby Segaran and Jeff Hammerbacher (Jul. 2009), pp. 150-153. (IPR Nos. '255 and '256 Exhibit 2014).
Inter Parties Review, Excerpts of Deposition of Craig L. Glennie, Ph.D., *Quanergy Systems, Inc.*, v. *Velodyne Lidar, Inc.*, No. 5:16-cv-05251-EJD (N.D. Cal.) (Jun. 27, 2017), 6 pages. (IPR Nos. '255 and '256 Exhibit 2016).
Velodyne Acoustics, Inc., Motor Specification, Merlin Project, Rev. E1 Initial Engineering Release (Apr. 29, 2009), 1 page. (IPR Nos. '255 and '256 Exhibit 2020).
Velodyne LiDAR, CAD Drawing of MotorStat3in, HDL-64E(2018), 1 page. (IPR Nos. '255 and '256 Exhibit 2021).
Velodyne Acoustics, Inc., Motor Winding Specs., P2.0 , E2 Changed Material (Mar. 10, 2010), 1 page. (IPR Nos. '255 and '256 Exhibit 2022).
Velodyne LiDAR, Inc., Production Worksheet, Item #30-AD230CER2 in Production, APD, 230UM, Ceramic Submount (Jan. 17, 2018), 1 pages. (IPR Nos. '255 and '256 Exhibit 2023).
Velodyne LiDAR, Inc., Production Worksheet Detector, Item #24-AD5009 in Production, AD500-9 NIR Photodiode (Jan. 18, 2018), 1 page. (IPR Nos. '255 and '256 Exhibit 2024).
Velodyne LiDAR, CAD Drawing of Rotor, HDL-64E (2018), 1 page. (IPR Nos. '255 and '256 Exhibit 2026).
Velodyne LiDAR, CAD Drawing of RotorAI, HDL-64E (2018), 1 page. (IPR Nos. '255 and '256 Exhibit 2027).
Velodyne LiDAR Products, PowerPoint (Jan. 18, 2017), 9 pages. (IPR Nos. '255 and '256 Exhibit 2031).
Velodyne LiDAR, Ultra Puck™ VLP-32 Data Sheet (2014), 2 pages. (IPR Nos. '255 and '256 Exhibit 2032).
Velodyne LiDAR, Excerpts of VLP-32C User Manual, 63-9325 Rev. B (2018), 26 pages. (IPR Nos. '255 and '256 Exhibit 2034).
Velodyne LiDAR, First Sensor Annual Report (2016), pp. 1-143. (IPR Nos. '255 and '256 Exhibit 2038).

(56) References Cited

OTHER PUBLICATIONS

Overton, First Sensor expands supply agreement for APDs used in Velodyne lidar systems, Laser Focus World (Feb. 15, 2017), 2 pages. (IPR Nos. '255 and '256 Exhibit 2039).
Ohnsman, How a 34-Year-Old Audio Equipment Company is Leading the Self-Driving Car Revolution, Forbes (Aug. 8, 2017), 7 pages. (IPR Nos. '255 and '256 Exhibit 2040).
ROS-Drivers—Error in packet rate for the VLP-32C #142, GitHub Forum (Jan. 29, 2018), 1 page. (IPR Nos. '255 and '256 Exhibit 2041).
Velodyne LiDAR, HDL-32E Data Sheet (2017), 2 pages. (IPR Nos. '255 and '256 Exhibit 2042).
Velodyne LiDAR, HDL-32E Envelope Drawing (2018), 1 page. (IPR Nos. '255 and '256 Exhibit 2043).
Velodyne LiDAR, HDL-32E User's Manual and Programing Guide (Aug. 2016), 29 pages. (IPR Nos. '255 and '256 Exhibit 2044).
Doyle, Velodyne HDL-64E Laser Rangefinder (LiDAR) Pseudo-Disassembled, Hizook (Jan. 4, 2009), 7 pages. (IPR Nos. '255 and '256 Exhibit 2046).
Velodyne LiDAR, HDL-64E S2 Datasheet (Mar. 2010), 2 pages. (IPR Nos. '255 and '256 Exhibit 2047).
Velodyne LiDAR, HDL-64E S3 Data Sheet (2016), 2 pages. (IPR Nos. '255 and '256 Exhibit 2048).
Velodyne LiDAR, HDL-64E S2 and S2.1 User's Manual and Programming Guide (Nov. 2012), 43 pages. (IPR Nos. '255 and '256 Exhibit 2050).
Velodyne LiDAR, HDL-64E S3 User's Manual and Programming Guide (May 2013), 54 pages. (IPR Nos. '255 and '256 Exhibit 2051).
Velodyne LiDAR, HDL-64E User's Manual (Mar. 2008), 21 pages. (IPR Nos. '255 and '256 Exhibit 2052).
Velodyne LiDAR, HDL-32E Supported Sensors, Poly Synch Docs 2.3.2, http://docs.polysync.io/sensors/velodyne-hdl-32e/ (2018), 7 pages. (IPR Nos. '255 and '256 Exhibit 2055).
Glennie et al., Temporal Stability of the Velodyne HDL-64E S2 Scanner for High Accuracy Scanning Applications, MDPI Remote Sensing (Mar. 14, 2011), 15 pages. (IPR Nos. '255 and '256 Exhibit 2057).
Velodyne LiDAR, Product Guide (2018), 1 page. (IPR Nos. '255 and '256 Exhibit 2058).
Velodyne LiDAR, White Paper, Velodyne's HDL-64E: A High Definition Lidar Sensor for 3-D Applications (Oct. 2007), 7 pages. (IPR Nos. '255 and '256 Exhibit 2059).
Velodyne LiDAR, Puck, Real-time 3D LiDAR Sensor, VLP-16 Data Sheet (2017), 2 pages. (IPR Nos. '255 and '256 Exhibit 2060).
Velodyne LiDAR, Envelope Hi Res VLP-16 Drawings, Rev. A (Jun. 30, 2016), 4 pages. (IPR Nos. '255 and '256 Exhibit 2061).
Velodyne LiDAR, VLP-16 User's Manual and Programming Guide (Mar. 2016), 49 pages. (IPR Nos. '255 and '256 Exhibit 2062).
Velodyne LiDAR, CAD Drawing of MotorStat-38in, HDL-64E (2018), 1 page. (IPR Nos. '255 and '256 Exhibit 2063).
Ramsey et al., Use Scenarios to Plan for Autonomous Vehicle Adoption, Gartner (Jun. 26, 2017), 17 pages. (IPR Nos. '255 and '256 Exhibit 2064).
Ford Media Center, Ford Tripling Autonomous Vehicle Development Fleet, Accelerating on-road Testing of Sensors and Software (Jan. 5, 2016), 4 pages. (IPR Nos. '255 and '256 Exhibit 2066).
Velodyne LiDAR, HDL-64E Data Sheet (2018), 2 pages. (IPR Nos. '255 and '256 Exhibit 2069).
Velodyne LiDAR, It Began With a Race . . . 16 Years of Velodyne LiDAR, Velodyne LiDAR Blog, available at http://velodynelidar.com/blog/it-began-with-a-race/ (2018), 8 pages. (IPR Nos. '255 and '256 Exhibit 2070).
Inter Parties Review, Quanergy M8 Lidar Sensor Datasheet, 2 pages. (IPR Nos. '255 and '256 Exhibit 2071).
D'Allegro, Meet the Inventor Trying to Bring LiDAR to the Masses, The Drive http://www.thedrive.com/sheetmetal/15567/meet-the-inventor-trying-to bring-lidar-to-the-masses (Oct. 28, 2017), 5 pages. (IPR Nos. '255 and '256 Exhibit 2072).

Williams, Driverless cars yield to reality: It's a long road ahead, PC World (Jul. 8, 2013), 6 pages. (IPR Nos. '255 and '256 Exhibit 2073).
Cameron, An Introduction to LiDAR: The Key Self-Driving Car Sensor, Voyage https://news.voyage.auto/an-introduction-to-lidar-the-key-self-drivingcar-sensor-a7e405590cff (May 9, 2017), 14 pages. (IPR Nos. '255 and '256 Exhibit 2074).
Chellapilla, LiDAR: The Smartest Sensor on a Self Driving Car, LinkedIn.com https://www.linkedin.com/pulse/lidar-smartest-sensor-self-driving-carkumar-chellapill (Jul. 31, 2017), 8 pages. (IPR Nos. '255 and '256 Exhibit 2075).
Popper, Guiding Light, The Billion-Dollar Widget Steering the Driverless Car Industry, The Verge (Oct. 18, 2017), 17 pages. (IPR Nos. '255 and '256 Exhibit 2076).
Fast Company, The World's 50 Most Innovative Companies 2017, https://www.fastcompany.com/most-innovative-companies/2017 (last visited Feb. 26, 2018), 5 pages. (IPR Nos. '255 and '256 Exhibit 2077).
Velodyne LiDAR, Velodyne Donates LiDAR and Robotic Artifacts to Smithsonian, Point of Engineering, Point of Beginning (May 23, 2011), 2 pages. (IPR Nos. '255 and '256 Exhibit 2078).
Informed Infrastructure, Velodyne LiDAR Division Announces Agreement with Caterpillar for Laser Imaging Technology, Informed Infrastructure http://informedinfrastructure.com/25630/velodynes-lidar-divisionannounces-agreement-with-caterpillar-for-laser-imaging-technology-2/ (Aug. 8, 2012), 3 pages. (IPR Nos. '255 and '256 Exhibit 2079).
Inter Parties Review, Defendant Velodyne's Answer and Counter-claim, *Quanergy Systems, Inc.*, v. *Velodyne Lidar, Inc.*, No. 5:16-cv-05251-EJD (N.D. Cal.) ECF No. 36 (Dec. 5, 2016), 56 pages. (IPR Nos. '255 and '256 Exhibit 2080).
Gargiulo, Velodyne Lidar Tops Winning Urban Challenge Vehicles, Business Wire (Nov. 6, 2007), 2 pages. (IPR Nos. '255 and '256 Exhibit 2082).
Strawa et al., The Measurement of Aerosol Optical Properties Using Continuous Wave Cavity Ring-Down Techniques, 20 Journal of Atmospheric and Oceanic Technology 454 (Apr. 2003), pp. 454-465. (IPR Nos. '255 and '256 Exhibit 2090).
Cheung, Spinning laser maker is the real winner of the Urban Challenge, Tech Guru Daily, available at http://www.tgdaily.com/trendwatch-features/34750-spinning-laser-maker-is-the-real-winner (Nov. 7, 2007), 7 pages. (IPR Nos. '255 and '256 Exhibit 2091).
Velodyne Acoustics, Inc., Outline Drawing HDL-64E S3 Envelope Drawing, Rev. A (Apr. 21, 2015), 1 page. (IPR Nos. '255 and '256 Exhibit 2094).
Businesswire, Velodyne LiDar Awarded "Industry Choice Company of the Year" at TU-Automotive Detroit Conference, Businesswire, https://www.businesswire.com/news/home/20180608005700/en/Velodyne-LiDAR-Awarded-%E2%80%9CIndustry-Choice-Company-Year%E2%80%9D (Jun. 8, 2018), 1 page. (IPR Nos. '255 and '256 Exhibit 2096).
Businesswire, Velodyne Displays Solid State, Highest Performing LiDAR for ADAS, Businesswire https://www.businesswire.com/news/home/20180107005088/en/Velodyne-Displays-Solid-State-Highest-Performing-LiDAR (Jan. 7, 2018), 2 pages. (IPR Nos. '255 and '256 Exhibit 2097).
Brustein et al., How a Billion-Dollar Autonomous Vehicle Startup Lost Its Way, Bloomberg https://www.bloomberg.com/news/features/2018-08-13/how-a-billiondollar-autonomous-vehicle-startup-lost-its-way (Aug. 13, 2018), 7 pages. (IPR Nos. '255 and '256 Exhibit 2098).
Automotive LiDAR, Market Presentation titled "Robotic Cars LiDAR Market in Million Dollars" (Apr. 2018), 86 pages. (IPR Nos. '255 and '256 Exhibit 2113).
Velodyne LiDAR, VLP-32C User Manual, 63-9325 Rev. B. (Feb. 2, 2018), 136 pages. (IPR Nos. '255 and '256 Exhibit 2114).
Inter Parties Review, Declaration of J. Gary Eden, Ph.D. in Support of Patent Owner's Responses and Motions to Amend (Public Version—Redacted) (Sep. 27, 2018), 202 pages. (IPR Nos. '255 and '256 Exhibit 2115).

(56) References Cited

OTHER PUBLICATIONS

Inter Parties Review, Transcript of Sep. 13, 2018 Conference Call, *Quanergy Systems, Inc. v. Velodyne Lidar, Inc.*, Nos. IPR2018-00255 and IPR2018-00256 (Sep. 13, 2018), 21 pages. (IPR Nos. '255 and '256 Exhibit 2116).
Hamamatsu, Position Sensitive Detectors ("PSDs") Webpage, One-dimensional and Two-dimensional (Mar. 17, 2006), 1 page. (IPR Nos. '255 and '256 Exhibit 2117).
Hamamatsu, One-dimensional PSD Plastic package, 1-D PSD with plastic package Datasheet ("1-D PSD Datasheet") (2004), 5 pages. (IPR Nos. '255 and '256 Exhibit 2118).
Hamamatsu, One-Dimensional PSD Webpage, One-dimensional (Mar. 17, 2006), 1 page. (IPR Nos. '255 and '256 Exhibit 2119).
Hamamatsu, Two-dimensional PSDs S1200, S1300, S1880, S1881, S2044—Non-discrete position sensor utilizing photodiode surface resistance Datasheet (2003), 6 pages. (IPR Nos. '255 and '256 Exhibit 2120).
Hamamatsu, Two-dimensional PSD S1300 Datasheet (Dec. 19, 2005), 1 page. (IPR Nos. '255 and '256 Exhibit 2121).
Hamamatsu, Two-dimensional PSDs Webpage (Mar. 17, 2006), 1 page. (IPR Nos. '255 and '256 Exhibit 2122).
Hamamatsu, CCD area image sensor S7030/S7031 Series Back-thinned FFT-CCD Datasheet (2006), 8 pages. (IPR Nos. '255 and '256 Exhibit 2123).
Hamamatsu, CCD Image Sensors Webpage ("CCD Image Sensors") (Feb. 2, 2006), 1 page. (IPR Nos. '255 and '256 Exhibit 2124).
Williams, Bias Voltage and Current Sense Circuits for Avalanche Photodiodes—Feeding and Reading the APD, Linear Technology AN92-1 (Nov. 2012), 32 pages. (IPR Nos. '255 and '256 Exhibit 2125).
Hamamatsu, Technical Information, SD-25—Characteristics and use of FFT-CCD area image sensor (Aug. 2003), 27 pages. (IPR Nos. '255 and '256 Exhibit 2126).
Hamamatsu, Technical Information, SD-28—Characteristics and use of Si APD (Avalanche Photodiode) (Aug. 2001), 12 pages. (IPR Nos. '255 and '256 Exhibit 2127).
Hamamatsu, Image Sensor Selection guide (Dec. 2003), 20 pages. (IPR Nos. '255 and '256 Exhibit 2128).
Hamamatsu, Photodiode Technical Information, 18 pages. (IPR Nos. '255 and '256 Exhibit 2129).
Hamamatsu, Silicon Photodiode Array Webpage (Feb. 2, 2006), 1 page. (IPR Nos. '255 and '256 Exhibit 2130).
Piatek, Presentation entitled 'LiDAR and Other Techniques—Measuring Distance with Light for Automotive Industry' authored by Slawomir Piatek, Technical Consultant, Hamamatsu Corp. (Dec. 6, 2017), 66 pages. (IPR Nos. '255 and '256 Exhibit 2131).
Piatek, Measuring distance with light, Hamamatsu.com, https://hub.hamamatsu.com/US/en/application-note/measuringdistance-with-light/index.html (Apr. 2, 2015), 18 pages. (IPR Nos. '255 and '256 Exhibit 2132).
Hergert et al., The WITS$ guide to selecting a photodetector, Hamamatsu.com, https://hub.hamamatsu.com/us/en/technical-note/WITS-guide-detectorselection/index.html (Jul. 2015), 16 pages. (IPR Nos. '255 and '256 Exhibit 2133).
Hamamatsu, Si photodiode array—S4111/S4114 series 16, 35, 46 element Si photodiode array for UV to NIR Datasheet (Jul. 2004), 4 pages. (IPR Nos. '255 and '256 Exhibit 2134).
Hamamatsu, S4111-46Q Si Photodiode Array Webpage (Oct. 22, 2005), 1 page. (IPR Nos. '255 and '256 Exhibit 2135).
Piatek et al., LiDAR: A photonics guide to autonomous vehicle market, Hamamatsu.com, https://hub.hamamatsu.com/us/en/application-note/LiDAR-competingtechnologies-automotive/index.html (Nov. 18, 2017), 6 pages. (IPR Nos. '255 and '256 Exhibit 2136).
Engineering Toolbox, The Engineering Toolbox Copper Tubes—ASTM B88 Datasheet (last accessed Jul. 10, 2018), 4 pages. (IPR Nos. '255 and '256 Exhibit 2137).
The American Society of Mechanical Engineers, Welded and Seamless Wrought Steel Pipe, ASME B36.10M-2004 (Oct. 25, 2004), 26 pages. (IPR Nos. '255 and '256 Exhibit 2138).
Copper Development Association Inc., Copper Tube Handbook—Industry Standard Guide for the Design and Installation of Copper Piping Systems, CDA Publication A4015-14.17: Copper Tube Handbook (2016), 96 pages. (IPR Nos. '255 and '256 Exhibit 2139).
Aufrere, et al., Perception for collision avoidance and autonomous driving, The Robots Institute, Carnegie Mellon University (2003), 14 pages (IPR Nos. '255 and '256 Exhibit 2140).
Blais, NRC-CNRC, Review of 20 Years of Range Sensor Development, National Research Council Canada (Jan. 2004), pp. 231-243 (IPR Nos. '255 and '256 Exhibit 2141).
Darpa, Grand Challenge '05—Frequently Asked Questions, DARPA. com, http://archive.darpa.mil/grandchallenge05/qa.html ) (2005), 3 pages. (IPR Nos. '255 and '256 Exhibit 2143).
DARPA, Urban Challenge, DARPA.com, http://archive.darpa.mil/grandchallenge/ ("DARPA Archive") (2007), 4 pages. (IPR Nos. '255 and '256 Exhibit 2144).
Garmin, How the LiDAR-Lite v3/v3HP works with reflective surfaces, GARMIN.com, https://support.garmin.com/en-US/?faq=IVeHYIKwChAY0qCVhQiJ67 (last visited Aug. 24, 2018), 2 pages. (IPR Nos. '255 and '256 Exhibit 2145).
Weber, Where to? A History of Autonomous Vehicles, Computer History Museum, https://support.garmin.com/en-US/?faq=IVeHYIKwChAY0qCVhQiJ67 (May 8, 2014), 23 pages. (IPR Nos. '255 and '256 Exhibit 2146).
Turk, et al., VITS—A Vision System for Autonomous Land Vehicle Navigation, 10 IEEE No. 3 (May 1988), pp. 342-361. (IPR Nos. '255 and '256 Exhibit 2147).
Amann, Laser ranging: a critical review of usual techniques for distance measurement, 40(1) Society of Photo-Optical Instrumentation Engineers (Jan. 2001), pp. 10-19. (IPR Nos. '255 and '256 Exhibit 2148).
Omron, Technical Explanation for Displacement Sensors and Measurement Sensors, CSM_Displacemente_LineWidth_TG_E_2_1 (2018), 8 pages. (IPR Nos. '255 and '256 Exhibit 2149).
Kaufmann, Choosing Your Detector, OE Magazine (Mar. 2005), 3 pages. (IPR Nos. '255 and '256 Exhibit 2150).
Kaufmann, Light Levels and Noise—Guide Detector Choices, Photonics Spectra 149 (Jul. 2000), 4 pages. (IPR Nos. '255 and '256 Exhibit 2151).
Kilpela, Pulsed Time-of-Flight Laser Range Finder Techniques for Fast, High Precision Measurement Applications (Academic dissertation, University of Oulu) (2004), 98 pages. (IPR Nos. '255 and '256 Exhibit 2152).
Makynen, Position-Sensitive Devices and Sensor System for Optical Tracking and Displacement Sensing Applications (Academic Dissertation, University of Oulu (2000), 121 pages. (IPR Nos. '255 and '256 Exhibit 2153).
MTI Instruments Inc., An Introduction to Laser Triangulation Sensors, https://www.azosensors.com/article.aspx?ArticleID=523 (Aug. 28, 2014), 9 pages. (IPR Nos. '255 and '256 Exhibit 2154).
Panasonic, Measurement Sensors: Specular vs Diffuse, Panasonic Blog, https://na.industrial.panasonic.com/blog/measurement-sensorsspecular-vs-diffuse (Dec. 7, 2011), 2 pages. (IPR Nos. '255 and '256 Exhibit 2155).
Inter Parties Review, Deposition of James F. Brennan, III, *Quanergy Systems, Inc. v. Velodyne Lidar, Inc.*, Nos. IPR2018-00255 and IPR2018-00256 (Aug. 23, 2018), 241 pages. (IPR Nos. '255 and '256 Exhibit 2156).
Uwinnipeg, Centripetal Acceleration, Uwinnipeg.ca, http://theory.uwinnipeg.ca/physics/circ/node6.html (1997), 2 pages. (IPR Nos. '255 and '256 Exhibit 2157).
Accetta et al., Active Electro-Optical Systems, The Infrared and Electro-Optical Systems Handbook (1993, ed. by Clifton Fox), pp. 3-76. (IPR Nos. '255 and '256 Exhibit 2158).
Hamamatsu, Image Sensors Webpage (Mar. 17, 2006), 1 page. (IPR Nos. '255 and '256 Exhibit 2160).
Maatta et al., A High-Precision Time-to-Digital Converter for Pulsed Time-of-Flight Laser Radar Applications, 47 IEEE No. 2, 521 (Apr. 1998), pp. 521-536. (IPR Nos. '255 and '256 Exhibit 2161).
English, et al., The Complementary Nature of triangulation and ladar technologies, 5791 Proceedings of SPIE (May 19, 2005), pp. 29-41. (IPR Nos. '255 and '256 Exhibit 2162).

(56) References Cited

OTHER PUBLICATIONS

Reymann et al., Improving LiDAR Point Cloud Classification using Intensities and Multiple Echoes, IEE/RSJ International Conference on Intelligent Robots and Systems (Sep. 2015), 8 pages. (IPR Nos. '255 and '256 Exhibit 2167).
Haran et al., Infrared Reflectivy of Pedestrian Mannequin for Autonomous Emergency Braking Testing, IEEE 19th International Conference on Intelligent Transportation Systems (ITSC) (2016), 6 pages. (IPR Nos. '255 and '256 Exhibit 2168).
Song et al., Assessing the Possibility of Land-Cover Classification Using LiDAR Intensity Data, Commission III, PCV02 (2002), 4 pages. (IPR Nos. '255 and '256 Exhibit 2169).
IBEO, IBEO Automobile Sensor GmbH—Scanner Technology webpage (Brennan Deposition Exhibit 1) (Mar. 23, 2004), 1 page. (IPR Nos. '255 and '256 Exhibit 2171).
IBEO, IBEO Automobile Sensor GmbH—The Alasca project webpage (Brennan Deposition Exhibit 2) (Oct. 6, 2003), 1 page. (IPR Nos. '255 and '256 Exhibit 2172).
Sick LMS200/211/221/291 Laser Measurement Systems—Technical Description (Brennan Deposition Exhibit 3) (2006), 48 pages. (IPR Nos. '255 and '256 Exhibit 2173).
Sick LMS 200/ LMS 211/ LMS 220 / LMS 221/ LMS 291 Laser Measurement Systems—Technical Description (Brennan Deposition Exhibit 4) (Jun. 2003), 40 pages. (IPR Nos. '255 and '256 Exhibit 2174).
Strang, Drawing of cross-section of I-beam by Jonathan Strang (Brennan Deposition Exhibit 5), (2018) 1 page. (IPR Nos. '255 and '256 Exhibit 2175).
Sick Laser Triangulation Sensors Product Information (Brennan Deposition Exhibit 6) (Jun. 25, 2018), 76 pages. (IPR Nos. '255 and '256 Exhibit 2176).
Thin Lens Equation, http://hyperphysics.phyastr.gsu.edu/hbase/geoopt/lenseq.html (last visited Dec. 30, 2018) (Brennan Deposition Exhibit 7), 4 pages. (IPR Nos. '255 and '256 Exhibit 2177).
Inter Parties Review, Images of Generator Rotors (Brennan Deposition Exhibit 8) (2018), 2 pages. (IPR Nos. '255 and '256 Exhibit 2178).
Sick DME 2000 Operating Instructions (Excerpt) (Brennan Deposition Exhibit 9) (May 2002), 42 pages. (IPR Nos. '255 and '256 Exhibit 2179).
Sick Sensick Measuring Distance with Light—Distance Sensors Product Overview (Brennan Deposition Exhibit 10) (2004), 12 pages. (IPR Nos. '255 and '256 Exhibit 2180).
Acuity, Acuity Short Range Sensors Product Information webpage (Brennan Deposition Exhibit 11) (last visited Dec. 30, 2018), 3 pages. (IPR Nos. '255 and '256 Exhibit 2181).
Acuity, Acuity Drill Pipe Runout Product Information webpage (Brennan Deposition Exhibit 12) (last visited Dec. 28, 2018), 2 pages. (IPR Nos. '255 and '256 Exhibit 2182).
Acuity, Acuity AR700 Laser Displacement Sensor Product Information webpage (Brennan Deposition Exhibit 13) (last visited Dec. 28, 2018), 9 pages. (IPR Nos. '255 and '256 Exhibit 2183).
Acuity, Acuity Aluminum Billet Scalping Production Information webpage (Brennan Deposition Exhibit 14) (last visited Dec. 28, 2018), 2 pages. (IPR Nos. '255 and '256 Exhibit 2184).
Kilpela, Excerpt of Pulsed Time-of-Flight Laser Range Finder Techniques for Fast, High Precision Measurement Applications, at Fig. 24 (Academic dissertation, University of Oulu (Brennan Deposition Exhibit 15) (2004), 1 page. (IPR Nos. '255 and '256 Exhibit 2185).
Brennan, Drawing of I-beam by Dr. Brennan (Brennan Deposition Exhibit 16), (Jan. 4, 2019), 1 page. (IPR Nos. '255 and '256 Exhibit 2186).
Yu et al., A New 3D Map Reconstruction Based Mobile Robot Navigation, IEEE (2006), 4 pages. (IPR Nos. '255 and '256 Exhibit 2189).
Furstenberg, et al., New Sensor for 360 Vehicle Surveillance—Innovative Approach to Stop & Go, Lane Assistance and Pedestrian Recognition (May 2001), 5 pages. (IPR Nos. '255 and '256 Exhibit 2190).
Ewald et al., Object Detection with Laser Scanners for Automotive Applications, IFAC Control in Transportation Systems (2000), pp. 369-372. (IPR Nos. '255 and '256 Exhibit 2191).
Fuerstenberg, et al., Pedestrian Recognition and Tracking of Vehicles using a vehicle based Multilayer Laserscanner, IEEE (2002), 12 pages. (IPR Nos. '255 and '256 Exhibit 2192).
Langheim, et al., Sensing of Car Environment at Low Speed Driving, Carsense (2002), 14 pages. (IPR Nos. '255 and '256 Exhibit 2193).
Inter Parties Review, Deposition of James F. Brennan, III, *Quanergy Systems, Inc.* v. *Velodyne Lidar, Inc.*, Nos. IPR2018-00255 and IPR2018-00256 (Jan. 4, 2019), 267 pages. (IPR Nos. '255 and '256 Exhibit 2194).
Kluge, Laserscanner for Automotive Applications (May 2001), 5 pages. (IPR Nos. '255 and '256 Exhibit 2196).
Kaempchen, Feature-Level Fusion of Laser Scanner and Video Data for Advanced Drive Assistance Systems (Ph.D. Dissertation, Ulm University) (2007), 248 pages. (IPR Nos. '255 and '256 Exhibit 2198).
Heenan, et al., Feature-Level Map Building and Object Recognition for Intersection Safety Applications, in Advanced Microsystems for Automotive Applications (Jurgen Valldorf and Wolfgang Gessner eds.) (2005), pp. 505-519. (IPR Nos. '255 and '256 Exhibit 2199).
Lages, Laserscanner for Obstacle Detection in Advanced Microsystems for Automotive Applications Yearbook (S. Kruger et al. eds.) (2002), pp. 136-140. (IPR Nos. '255 and '256 Exhibit 2200).
Inter Parties Review, Declaration of J. Gary Eden, Ph.D. in Support of Patent Owner's Reply in Support of Its Motion to Amend (Jan. 16, 2019), 71 pages. (IPR Nos. '255 and '256 Exhibit 2202).
Inter Parties Review, PTAB Conference Call, *Quanergy Systems, Inc.* v. *Velodyne Lidar, Inc.*, Nos. IPR2018-00255 and 2018-00256 (Jan. 11, 2019), 27 pages. (IPR Nos. '255 and '256 Exhibit 2204).
Macadam, Understanding and Modeling the Human Driver, 40 Vehicle System Dynamics, Nos. 1-3 (2003), pp. 101-134. (IPR Nos. '255 and '256 Exhibit 2205).
Taranovich, Are processor algorithms key to safe self-driving cars? EDN Asia, https://www.ednasia.com/news/article/are-processor-algorithms-key-tosafe-self-driving-cars (Jul. 7, 2016), 11 pages. (IPR Nos. '255 and '256 Exhibit 2206).
IPO Education Foundation, Inventor of the Year Award, https://www.ipoef.org/inventor-of-the-year/ (2018), 5 pages. (IPR Nos. '255 and '256 Exhibit 2207).
Inter Parties Review, Petition for Inter Partes Review of U.S. Pat. No. 7,969,558 (Claims 16-19 and 23-25) (IPR No. 2018-00256, *Quanergy Systems, Inc.* v. *Velodyne Lidar, Inc.*) (Nov. 29, 2017), 73 pages. (IPR No. 2018-00256).
Inter Parties Review, Replacement Petition for Inter Partes Review of U.S. Pat. No. 7,969,558 (Claims 16-19 and 23-25) (2018) 76 pages. (IPR No. 2018-00256).
Inter Parties Review, Patent Owner's Preliminary Response (Public Version—Redacted) (dated Mar. 7, 2018), 73 pages. (IPR No. 2018-00256).
Inter Parties Review, Decision: Institution of Inter Partes Review (May 25, 2018), 12 pages. (IPR No. 2018-00256).
Inter Parties Review, Petitioner's Motion to Submit Supplemental Information Pursuant to 37 C.F.R. § 42.123(b) (Aug. 6, 2018), 16 pages. (IPR No. 2018-00256).
Inter Parties Review, Decision: Petitioner's Motion to Submit Supplemental Information Pursuant to 37 C.F.R. § 42.123(b) (Aug. 8, 2018), 4 pages. (IPR No. 2018-00256).
Inter Parties Review, Patent Owner's Response (Public Version—Redacted) (dated Sep. 28, 2018), 92 pages. (IPR No. 2018-00256).
Inter Parties Review, Patent Owner's Contingent Motion to Amend (Public Version—Redacted) (Sep. 28, 2018), 57 pages. (IPR No. 2018-00256).
Inter Parties Review, Petitioner's Unopposed Motion to Submit Replacement Petition and Supplemental Declaration (Nov. 5, 2018), 9 pages. (IPR No. 2018-00256).
Inter Parties Review, Petitioner's Reply to Patent Owner's Response (dated Dec. 21, 2018), 37 pages. (IPR No. 2018-00256).
Inter Parties Review, Petitioner Quanergy's Opposition to Patent Owner's Contingent Motion to Amend (Dec. 21, 2018), 35 pages. (IPR No. 2018-00256).

(56) References Cited

OTHER PUBLICATIONS

Inter Parties Review, Patent Owner's Surreply (Jan. 16, 2019), 50 pages. (IPR No. 2018-00256).
Inter Parties Review, Patent Owner's Reply in Support of Its Contingent Motion to Amend (Jan. 16, 2019), 33 pages. (IPR No. 2018-00256).
Inter Parties Review, Petitioner's Updated Exhibit List (Jan. 30, 2019), 15 pages. (IPR No. 2018-00256).
Inter Parties Review, Petitioner Quanergy's Sur-Surreply (Jan. 30, 2019), 9 pages. (IPR No. 2018-00256).
Inter Parties Review, Petitioner Quanergy's Surreply to Patent Owner's Contingent Motion to Amend (Jan. 30, 2019), 17 pages. (IPR No. 2018-00256).
Inter Parties Review, Patent Owner's Updated Exhibit List (Feb. 11, 2019), 20 pages. (IPR No. 2018-00256).
Inter Parties Review, Final Written Decision (dated May 23, 2019), 41 pages. (IPR No. 2018- 00256).
Inter Parties Review, Petitioner's Request for Rehearing (Jun. 24, 2019), 20 pages. (IPR No. 2018-00256).
Inter Parties Review, Decision Denying Petitioner's Request for Rehearing (May 21, 2020), 26 pages. (IPR No. 2018-00256).
Besl, Active, Optical Range Imaging Sensors Machine Visions and Applications (1988), Springer-Verlag New York Inc., pp. 1:127-152 (IPR Nos. '255 and '256 Exhibit 1015).
Carson, N. "Defending GPS against the Spoofing Threat using Network Based Detection and 3, 15,20 Successive Interference Cancellation". Auburn University. Nov. 2015, 35 pages.
Excelitas Technologies, "Avalanche Photodiode. A User Guide", 2011 Excelitas Technologies Corp., pp. 1-8.
Hall, et al., Team DAD Technical Paper, DARPA Grand Challenge 2005, XP-002543336, Aug. 26, 2005, pp. 1-12. (IPR Nos. '255 and '256 Exhibit 1081).
U.S. Patent Office, Information Disclosure Statement, U.S. Appl. No. 10/391,383 (U.S. Pat. No. 7130672, Pewzner) (Aug. 3, 2005), 8 pages.
U.S. Patent Office, Information Disclosure Statement, U.S. Appl. No. 10/508,232 (U.S. Pat. No. 7,313,424, Mayevsky) (Apr. 21, 2006), 17 pages.
PCT International Search Report and Written Opinion, App. No. PCT/US2018/059452, dated Jan. 16, 2019, 12 pages.
Juberts, et al., "Status report on next generation LADAR for driving unmanned ground vehicles" Mobile Robots XVII, edited by Douglas W. Gage, Proceedings of SPIE, vol. 5609, 2004, pp. 1-12.
Kawata, "Development of ultra-small lightweight optical range sensor system", 2005 IEEE/RSJ International Conference on Intelligent Robots and Systems, Edmonton, AB, Canada, Aug. 2-6, 2005, pp. 58-63 (IPR Nos. '255 and '256 Exhibit 1033).
Laser Components Produkte, Laser Components IG, Inc., 2004, 1 page.
Laser Components, "High Power Pulsed Laser Diodes 905D3J08-Series", Laser Components IG, Inc., 2004, 6 pages.
Liu, et al., "Coupling Study of a Rotary Capacitive Power Transfer System" Industrial Technology, 2009. ICIT 2009. IEEE International Conference, IEEE, Piscataway, NJ, USA, Feb. 10, 2009, pp. 1-6.
Manandhar, "Auto-Extraction of Urban Features from Vehicle-Borne Laser Data", Centre for Spatial Information Science, The University of Tokyo, Japan; Symposium on Geospatial Theory, Processing Applications, Ottawa (2002) 6 pages. (IPR Nos. '255 and '256 Exhibit 1017).
Morsy et al., "Multispectral LiDAR Data for Land Cover Classification of Urban Areas," Sensors 17(5), 958 (2017), 21 pages.
Office of the Federal Register National Archives and Records Administration, "Code of Federal Regulations, 21, Parts 800 to 1299, Revised as of Apr. 1, 2005, Food and Drugs", Apr. 1, 2005, pp. 1-23.
Saleh, "Fundamentals of Photonics" vol. 2, Wiley-Interscience Publication, 1991, pp. 342-383, 494-541, and 592-695. (IPR Nos. '255 and '256 Exhibit 1008).

Skolnik, "Radar Handbook" Second Edition, McGraw-Hill Publishing Company, 1990, pp. 1-1191.
The Laser Institute of America, "American National Standard of Safe Use of Lasers" ANSI Z136.1-2000, Revision of ANSI Z136.1-1993, Second Printing 2003, 32 pages.
Westinghouse, "AN/TPS-43 E Tactical Radar System" (1999), pp. 1-14.
PCT International Search Report and Written Opinion, App. No. PCT/US2018/025395, dated Jun. 25, 2018, 14 pages.
PCT International Search Report and Written Opinion, App. No. PCT/US2017/015874, dated May 23, 2017, 12 pages.
PCT International Search Report and Written Opinion, App. No. PCT/US2017/015877, dated Apr. 13, 2017, 13 pages.
PCT International Search Report and Written Opinion, App. No. PCT/US2007/073490, (2008), 10 pages.
PCT International Search Report and Written Opinion, App. No. PCT/US2017/023261, dated May 26, 2017, 11 pages.
PCT International Search Report and Written Opinion, App. No. PCT/US2018/051497, dated Nov. 28, 2018, 11 pages.
PCT International Search Report and Written Opinion, App. No. PCT/US2019/046422, dated Dec. 3, 2019, 9 pages.
PCT International Search Report and Written Opinion, App. No. PCT/US2018/023283, dated Jun. 1, 2018, 9 pages.
PCT International Search Report and Written Opinion, App. No. PCT/US2017/023259, dated May 31, 2017, 10 pages.
PCT International Search Report and Written Opinion, App. No. PCT/US2017/015869, dated Apr. 10, 2017, 12 pages.
PCT International Search Report and Written Opinion, App. No. PCT/US2018/050934, dated Nov. 20, 2018, 10 pages.
PCT International Search Report and Written Opinion, App. No. PCT/US2010/037129, dated Jul. 27, 2010, 6 pages.
PCT International Search Report and Written Opinion, App. No. PCT/US2017/036865, dated Sep. 26, 2017, 10 pages.
PCT International Search Report and Written Opinion, App. No. PCT/US2017/023262, dated Jun. 5, 2017, 9 pages.
PCT International Search Report and Written Opinion, App. No. PCT/US2017/047543, dated Nov. 27, 2017, 11 pages.
PCT International Search Report and Written Opinion, App. No. PCT/US2018/059062, dated Jan. 16, 2019, 6 pages.
PCT International Search Report and Written Opinion, App. No. PCT/US2019/046573, dated Nov. 15, 2019, 9 pages.
PCT International Search Report and Written Opinion, App. No. PCT/US2019/016259, dated Apr. 26, 2019, 6 pages.
PCT International Search Report and Written Opinion, App. No. PCT/US2019/051729, dated Nov. 20, 2019, 7 pages.
Jelalian, "Laser Radar Systems" (1992), 1 page.
Code of Federal Regulations, Food and Drugs Rule—Performance Standards for Light-Emitting Products, 21 C.F.R. § 1040.10 (2005).
Singh, "Cyclone: A Laser Scanner for Mobile Robot Navigation" (Sep. 1991), pp. 1-18.
Bornstein, "Where am I? Sensors and Methods for Mobile Robot Positioning" (1996), pp. 95-112.
Nagappan, "Adaptive Cruise Control: Laser Diodes as an Alternative to Millimeter Wave Radars" (Sep. 2005), pp. 1-5.
Hancock, "Laser Intensity Based Obstacle Detecting and Tracking" (Jan. 1999), pp. 45-65.
Zhao, "Reconstructing Textured CAD Model of Urban Environment Using Vehicle-Borne Laser Range Scanners and Line Cameras," Lecture Notes in Computer Science, vol. 2095 (2001), pp. 284-297.
Reutebuch, "LiDAR: an Emerging Tool for Multiple Resource Inventory," Journal of Forestry (Sep. 2005) 7 pages.
Zheng, "The Technique of Land 3D Laser Scanning and Imaging Surveying," Railway Aerial Survey, vol. 2 (2003), 3 pages.
Qing, "Method of 3D visualization using laser radar on board of mobile robot," Journal of Jilin University (Information Science Ed.), vol. 22 (Jul. 2004), 4 pages.
Widmann, "Development of Collision Avoidance Systems at Delphi Automotive Systems" (1998), pp. 353-358.
Fischer, "Rapid Measurement and Mapping of Tracer Gas Concentrations in a Large Indoor Space" (May 2000), 27 pages.
Marino, "Jigsaw: A Foliage-Penetrating 3D Imaging Laser Radar System" (2005), pp. 23-36.

(56) References Cited

OTHER PUBLICATIONS

Thrun, "Probabilistic Terrain Analysis for High-Speed Desert Driving" (Oct. 2005), 7 pages.
Oshkosh, "Team Terramax: DARPA Grand Challenge 2005" (Oct. 2005), pp. 1-14.
Glennie, Reign of Point Clouds: A Kinematic Terrestrial LiDAR Scanning System (2007), pp. 22-31.
Ullrich, et al., "High-performance 3D-imaging laser sensor," Proceedings of SPIE vol. 3707 (Jun. 1999), pp. 658-664. (IPR Nos. '255 and '256 Exhibit 1014).
Ozguner, "Team TerraMax and the DARPA Grand Challenge: a General Overview," IEEE Intelligent Vehicles Symposium (2004), 6 pages.
Laser Components, https:/web.archive.org/web/20041205172904/ http:www.lasercomponents.com (2004), 1 page. (IPR Nos. '255 and '256 Exhibit 1023).
*Quanergy Systems, Inc.* v. *Velodyne LiDAR, Inc.* (N.D. Cal.), Case No. 5:16-cv-05251, "Plaintiff Quanergy Systems, Inc.'s Invalidity Contentions and Production of Documents Pursuant to Patent Local Rules 3-3 and 3-4," Mar. 27, 2017, 24 pages.
*Quanergy Systems, Inc.* v. *Velodyne LiDAR, Inc.* (N.D. Cal.), Case No. 5:16-cv-05251, "Plaintiff Quanergy Systems, Inc.'s Amended Invalidity Contentions Pursuant to Patent Local Rule 3-3," May 23, 2017, 238 pages.
*Quanergy Systems, Inc.* v. *Velodyne LiDAR, Inc.* (N.D. Cal.), Complaint, Case No. 5:16-cv-05251 (Sep. 13, 2016), 21 pages.
*Quanergy Systems, Inc.* v. *Velodyne LiDAR, Inc.* (N.D. Cal.), Case No. 5:16-cv-05251, Amended Complaint, Nov. 18, 2016, 6 pages.
*Quanergy Systems, Inc.* v. *Velodyne LiDAR, Inc.* (N.D. Cal.), Case No. 5:16-cv-05251, Defendant Velodyne's Answer and Counterclaim, Dec. 5, 2016, 20 pages.
*Quanergy Systems, Inc.* v. *Velodyne LiDAR, Inc.* (N.D. Cal.), Case No. 5:16-cv-05251, Answer to Counterclaim, (Jan. 16, 2017) 9 pages.
*Velodyne Lidar, Inc.* v. *Hesai Photonics Technology Co., Ltd.* (N.D. Cal.), Complaint, Case No. 5:19-cv-04742 (Aug. 13, 2019), 13 pages.
*Velodyne Lidar, Inc.* v. *Sunteng Innovation Technology Co., Ltd.* ("Robosense") (N.D. Cal.), Complaint, Case No. 5:19-cv-04746 (Aug. 13, 2019), 13 pages.
Mercotac Model 305, Electrical Slip Rings, https://web.archive.org/web/200602100652519/www.mercotac.com/html/305.htm (Feb. 2006), 3 pages.
Mercotac, 3-Conductor Rotary Electrical Connectors https://web.archive.org/web/20060317120209/http://www.mercotac.com:80/html/threeconductor.html (Mar. 2006), 1 page.
McManamon, "Optical Phased Array Technology," Proceedings of the IEEE, vol. 84, No. 2 (Feb. 1996), pp. 268-298.
Chapman, "Introduction to Laser Safety" (Sep. 10, 2007), 19 pages.
Willhoeft et al., "Quasi-3D Scanning with Laserscanners," IBEO Automobile Sensor, 8th World Congress on Intelligent Transport Systems—Quasi-3D Scanning (2001), IBEO Automobile Sensor, 8th World Congress on Intelligent Transport Systems—Quasi-3D Scanning (2001), 12 pages. (IPR Nos. '255 and '256 Exhibit 1077).
Wulf et al., "Fast 3D Scanning Methods for Laser Measurement Systems, CSCS-14, 14th Int'l Conference on Control Systems and Computer Science" (Jul. 2003), pp. 312-317. (IPR Nos. '255 and '256 Exhibit 1078).
Wulf, "2D Mapping of Cluttered Indoor Environments by Means of 3D Perception," Proceedings of the 2004 IEEE International Conference on Robotics & Automation (Apr. 2004), pp. 4204-4209.
Riegl, "Riegl LMS-Z210" (2003), 8 pages.
SPIES, "Extended Eyes—Sense and Avoid," Presented at the 2006 International Aerospace Exhibition, Berlin (May 2006), 22 pages.
IBEO, "IBEO multilayer tech" (2004), 1 page.
IBEO, "IBEO Time of Flight" (2004), 1 page.
IBEO, "IBEO products," https://web.archive.org/web/20040606115118/http:/www.ibeoas.de:80/html/prod/prod.html (2004), 1 page.
IBEO, "IBEO multitarget capability," https://web.archive.org/web/20040323030746/, http/:www.ibeoas.de:80/html/knho/knho-senstech-mlc.html (2004), 1 page.
IBEO, "IBEO," https://web.archive.org/web/20040202131331/http:/www.ibeo-as.de:8 (2004), 1 page.
IBEO, "IBEO about," https://web.archive.org/web/20040606111631/http:/www.ibeoas.de:80/html/about/about (2004).
IBEO, "IBEO history," https://web.archive.org/web/20040807161657/, http:/www.ibeoas.de:80/html/about/ab_history.html (2004), 1 page.
IBEO, "IBEO roadmap," https://web.archive.org/web/20041209032449/http:/www.ibeoas.de:80/html/prod/prod_roadmap.html (2004), 1 page.
IBEO, "IBEO data and prices," https://web.archive.org/web/20041209025137/ http://www.ibeoas.de:80/html/prod/prod_dataprices.html (2004), 2 pages.
IBEO, "IBEO products," https://web.archive.org/web/20041011011528/http://www.ibeoas.de:80/html/prod/prod.html (2004), 1 page.
IBEO, "IBEO publications," https://web.archive.org/web/20031208175052/ http://www.ibeoas.de:80/html/public/public.html (2003), 2 pages.
IBEO, "IBEO Motiv sensor," https://web.archive.org/web/20040113062910/, http://www.ibeoas.de:80/html/rd/rd_rs_motiv.htm (1997-2000), 1 page.
IBEO, "IBEO LD Multilayer data sheet," https://web.archive.org/web/20031003201743/ http://www.ibeoas.de:80/html/prod/prod_Id_multi.html (2003), 1 page.
Fox, "Active electro-optical systems," The infrared and electro-optical systems handbook, vol. 6 (1993), pp. 1-80.
Gustavson, "Diode-laser radar for low-cost weapon guidance," SPIE vol. 1633, Laser radar VII (1992), pp. 1-12.
Skolnik, "Introduction to radar systems," Second edition, McGraw-Hill book company (1980), pp. 1-3.
Trepagnier, "Team gray technical paper," DARPA grand challenge 2005 (Aug. 28, 2005), 14 pages.
Riegl LMS-Q120, http://web.archive.org/web/20050113054822/ http://www.riegl.com/industrial_scanners_/lms_q120_/q120_all_.htm (2005), 4 pages.
Glennie, Performance analysis of a kinematic terrestrial LiDAR scanning system, MAPPS/ASPRS 2006 fall conference (Nov. 6-10, 2006), 9 pages.
Albota, "Three-dimensional imaging laser RADAR with a photon-counting avalanche photodiode array and microchip laser," Applied optics, vol. 41, No. 36 (Dec. 20, 2002), 8 pages.
Marino, "A compact 3D imaging laser RADAR system using Geiger-mode APD arrays: system and measurements," Proceedings of SPIE—The international society for optical engineering (Aug. 2003), 16 pages.
Zhao, "A vehicle-borne urban 3-D acquisition system using single-row laser range scanners," IEEE transactions on systems, man, and cybernetics, vol. 33, No. 4 (Aug. 2003), pp. 658-666.
Fuerstenberg, Pedestrian detection and classification by laserscanners, (2003), 8 pages.
Kohanbash, "LiDAR fundamentals–robots for roboticists" (May 5, 2014), 6 pages.
Sensick, "DME 2000 / DME 3000: Precise non-contact distance determination," Sensick Catalogue (2006), pp. 450-457. (IPR Nos. '255 and '256 Exhibit 1073).
Lamon, "The SmarTer for ELROB 2006—a vehicle for fully autonomous navigation and mapping in outdoor environments" (2005), 14 pages.
Urmson, "High speed navigation of unrehearsed terrain: red team technology for grand challenge 2004" (Jun. 1, 2004), 47 pages.
Ohr, "War raises stakes of next DARPA bot race," EDN (Aug. 15, 2005), 3 pages.
Cravotta, "Operating alone," EDN (Dec. 5, 2005), 6 pages.
International Electrotechnical Commission, "Safety of laser products—part 1: equipment classification and requirements," International Standard IEC 60825-1, edition 1.2 (Aug. 2001), 122 pages.
International Electrotechnical Commission, "Safety of laser products—part 1: equipment classification and requirements," International Standard IEC 60825-1, edition 2.0 (2007), 104 pages.
Stone, "Performance analysis of next-generation LADAR for manufacturing, construction, and mobility" (May 2004), 198 pages.

(56) References Cited

OTHER PUBLICATIONS

U.S. International Trade Commission, Investigation No. 337-TA-1173, "Respondent Hesai Photonics Technology Co., Ltd.'s Notice of Prior Art," Nov. 13, 2019, 35 pages.
U.S. International Trade Commission, Investigation No. 337-TA-1173, "Respondent Robosense's Notice of Prior Art," Nov. 13, 2019, 34 pages.
Aiestaran et al. "A Fluorescent Linear Optical Fiber Position Sensor" Elsevier B.V. May 21, 2008 (4 pages).
European Patent Office, Office Action, App. No. EP 11166432.2 (dated Oct. 7, 2019), 6 pages.
Canadian Patent Office, Office Action, App. No. CA 3,012,003 (dated Aug. 28, 2019), 3 pages.
Canadian Patent Office, Office Action, App. No. CA 3,017,735 (dated Aug. 28, 2019), 3 pages.
Canadian Patent Office, Office Action, App. No. CA 3,017,811 (dated Aug. 28, 2019), 3 pages.
European Patent Office, Office Action, App. No. EP 07840406.8 (dated Mar. 15, 2011) 7 pages.
European Patent Office, Office Action, App. No. EP 11166432.2 (dated Jan. 29, 2019), 3 pages.
European Patent Office, Office Action, App. No. EP 11166432.2 (dated Oct. 14, 2016), 4 pages.
European Patent Office, Office Action, App. No. EP 11166432.2 (dated Oct. 5, 2015), 4 pages.
PCT Search Report and Written Opinion (Corrected), App. No. PCT/US2020/026925, dated May 12, 2020, 5 pages.
PCT Search Report and Written Opinion, App. No. PCT/US2020/012633, dated Jun. 2, 2020, 13 pages.
PCT Search Report and Written Opinion, App. No. PCT/US2020/012635, dated Jun. 4, 2020, 10 pages.
Search Report and Opinion, EP App. No. 07840406.8, dated Sep. 8, 2009, 6 pages.
Search Report and Opinion, EP App. No. 11166432.2, dated Jul. 28, 2011, 7 pages.
Search Report and Opinion, EP App. No. 17745112.7, dated Aug. 27, 2019, 8 pages.
Search Report and Opinion, EP App. No. 17770748.6, dated Oct. 22, 2019, 10 pages.
Search Report and Opinion, EP App. No. 17770926.8, dated Oct. 29, 2019, 11 pages.
Search Report and Opinion, EP App. No. 17770928.4, dated Oct. 29, 2019, 10 pages.
Search Report and Opinion, EP App. No. 17807474.6, dated Dec. 9, 2019, 9 pages.
DARPA, Grand Challenge Media—Frequently Asked Questions (Media), DARPA.com, http://archive.darpa.mil/grandchallenge04/media_faq.htm (2004), 3 pages. (IPR Nos. '255 and '256 Exhibit 2142).
ULTRA Puck, VLP-32C Data Sheet (2018), 2 pages. (IPR Nos. '255 and '256 Exhibit 2093).
PCT International Search Report and Written Opinion, App. No. PCT/US2018/031682, dated Sep. 17, 2018, 12 pages.
PCT International Search Report and Written Opinion, App. No. PCT/US2017/035427, dated Aug. 29, 2017, 10 pages.
PCT International Search Report and Written Opinion, App. No. PCT/US2019/046412, dated Jun. 24, 2020, 10 pages.
PCT International Search Report and Written Opinion, App. No. PCT/US2019/046419, dated Oct. 29, 201, 14 pages.
Extended European Search Report of Appl. No. 19875552.2 dated Aug. 23, 2021, 10 pages.
Russian Patent Office, Office Action, App. No. 2021107542 (dated Mar. 23, 2022), 14 pages.
Russian Search Report for Appl. No. 2021107542 dated Aug. 13, 2019, 4 pages.
CN201980070155.3, "Office Action", dated Sep. 22, 2023, 30 pages.

* cited by examiner

300

*Single emitter/detector pair rotating mirror lidar design*

Interference arc is static if oscillator delta is 0; with a difference the interference arc moves in or out On Interference Pattern FIG. 5A:

- Interference may move away from Sensor A and towards Sensor B depending on $f_{CLK\_A}$ versus $f_{CLK\_B}$.

- The speed of the interference may be proportional to $\Delta f = f_{CLK\_A} - f_{CLK\_B}$

- If $\Delta f = 0$, the interference may remain stationary

600

- Suppress laser firing during passive cycles
- Suppress laser power control feedback so that passive cycles don't affect laser power settings of active cycles

Notch Filter

- Occasionally sample passive returns
- Create selective notch filter in FW for any returns that lie on the same radius as the detected passive returns.
- Remove artifact from the next active capture

700

SYSTEMS AND METHODS FOR MITIGATING OPTICAL CROSSTALK IN A LIGHT RANGING AND DETECTION SYSTEM

BACKGROUND

A. Technical Field

The present disclosure relates generally to systems and methods for improving detection of multi-return light signals, and more particularly to the mitigation of optical crosstalk in a Light Detection And Ranging (LIDAR) system.

B. Background

LIDAR systems use a pulse of light to measure distance, usually based on time of flight (TOF), i.e., the time of light transmission to an object and the time of the return reflection. With a collection of these measurements, LIDAR system can determine their surroundings in two or three dimensions. LIDAR systems are used as one of the sensor systems for self-driving cars, in addition to cameras and other radar systems.

Mobile pulse scanning LIDAR systems are essential components of intelligent vehicles capable of autonomous travel. Obstacle detection functions of autonomous vehicles require very low failure rates. With the increasing number of autonomous vehicles equipped with scanning LIDAR systems to detect and avoid obstacles and navigate safely through the environment, the probability of mutual interference and optical crosstalk can become an important issue. In simple terms, optical crosstalk may occur when a LIDAR system detects and processes a laser beam transmitted by another LIDAR system. With autonomous vehicles being configured with multiple LIDAR systems, the opportunity for interference may significantly increases. The reception of foreign laser pulses at each LIDAR system can lead to problems such as ghost targets or a reduced signal-to-noise ratio.

Accordingly, what is needed are systems and methods that can the mitigation of optical crosstalk in a LIDAR system.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures are not to scale.

Figure ("FIG.") 1 depicts the operation of a light detection and ranging system according to embodiments of the present document.

DETAILED DESCRIPTION OF EMBODIMENTS

Figure 1:
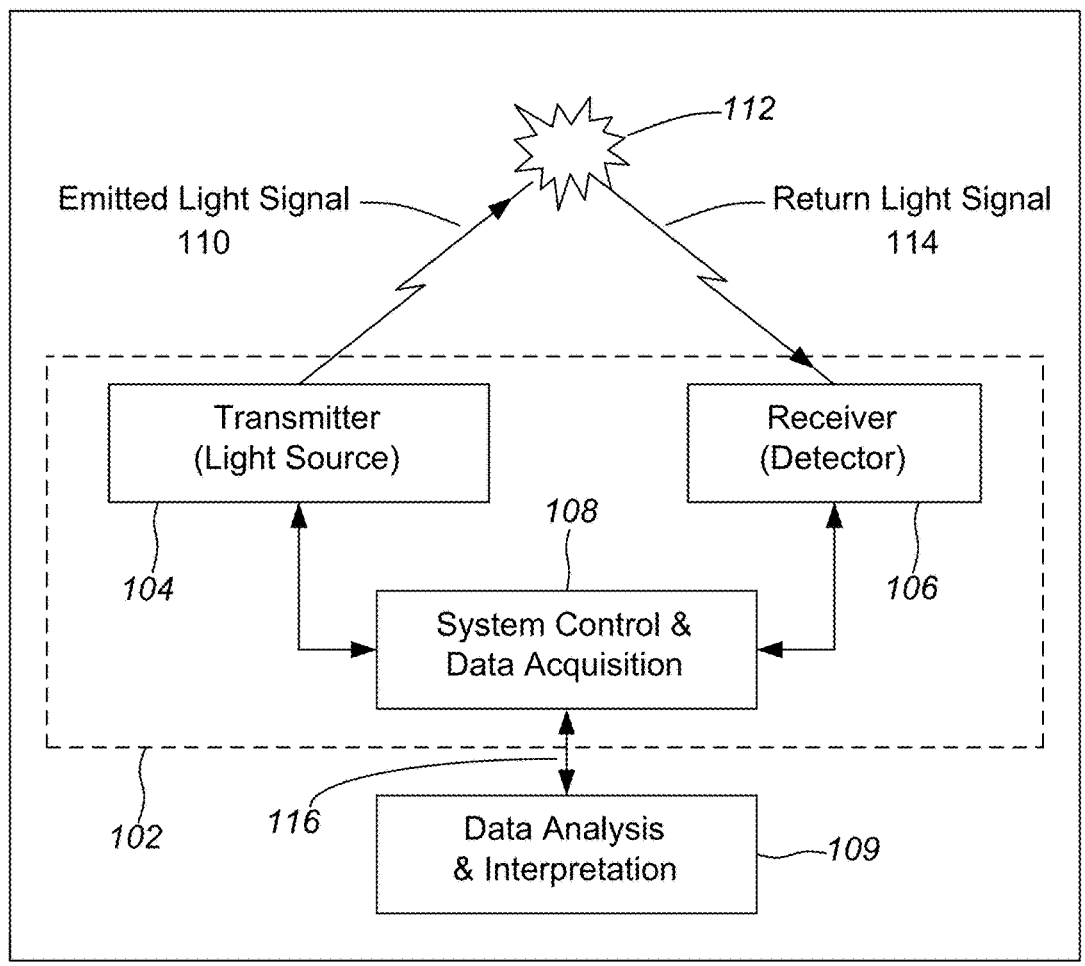

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

The terms "include," "including," "comprise," and "comprising" shall be understood to be open terms and any lists the follow are examples and not meant to be limited to the listed items. Any headings used herein are for organizational purposes only and shall not be used to limit the scope of the description or the claims. Each reference mentioned in this patent document is incorporate by reference herein in its entirety.

Furthermore, one skilled in the art shall recognize that: (1) certain steps may optionally be performed; (2) steps may not be limited to the specific order set forth herein; (3) certain steps may be performed in different orders; and (4) certain steps may be done concurrently.

C. Light Detection and Ranging System

Light detection and ranging systems, such as LIDAR systems, may employ pulses of light to measure distance to an object based on the time of flight (TOF) of each pulse of light. A pulse of light emitted from a light source of a light detection and ranging system interacts with a distal object. A portion of the light reflects from the object and returns to a detector of the light detection and ranging system. Based on the time elapsed between emission of the pulse of light and detection of the returned pulse of light, the distance to the object may be estimated. In some embodiments, pulses of light may be generated by a laser emitter. The light pulse may be focused through a lens or lens assembly. The light pulse may hit multiple objects, each having a different distance from the laser, causing multi-return signals to be received by the light detection and ranging system detector. Multi-return signals may provide more information of the environment to improve mapping or reconstruction. A dedicated detector may be required to precisely identify each return with its associated time delay information Accordingly, a light detection and ranging system, such as a LIDAR system, may be a tool to measure the shape and contour of the environment surrounding the system. LIDAR systems may be applied to numerous applications including both autonomous navigation and aerial mapping of a surface. LIDAR systems emit a light pulse that is subsequently reflected off an object within the environment in which a system operates. The time each pulse travels from being emitted to being received may be measured (i.e., time-of-flight "TOF") to determine the distance between the object and the LIDAR system. The science is based on the physics of light and optics.

In a LIDAR system, light may be emitted from a rapidly firing laser. Laser light travels through a medium and reflects off points of things in the environment like buildings, tree branches and vehicles. The reflected light energy returns to a LIDAR receiver (detector) where it is recorded and used to map the environment.

FIG. 1 depicts operation 100 of a light detection and ranging system according to embodiments of the present document. Included are light detection and ranging components 102 and data analysis & interpretation 109 according to embodiments of the present document. Light detection and ranging components 102 may comprise a transmitter 104 that transmits emitted light signal 110, receiver 106 comprising a detector, and system control and data acquisition 108. Emitted light signal 110 propagates through a medium and reflects off object 112. Return light signal 114 propagates through the medium and is received by receiver 106. System control and data acquisition 108 may control the light emission by transmitter 104 and the data acquisition may record the return light signal 114 detected by receiver 106. Data analysis & interpretation 109 may receive an output via connection 116 from system control and data acquisition 108 and perform data analysis functions. Connection 116 may be implemented with a wireless or non-contact communication method. Transmitter 104 and receiver 106 may include optical lens and mirrors (not shown). Transmitter 104 may emit a laser beam having a plurality of pulses in a particular sequence. In some embodiments, light detection and ranging components 102 and data analysis & interpretation 109 comprise a LIDAR system.

Figure 2:
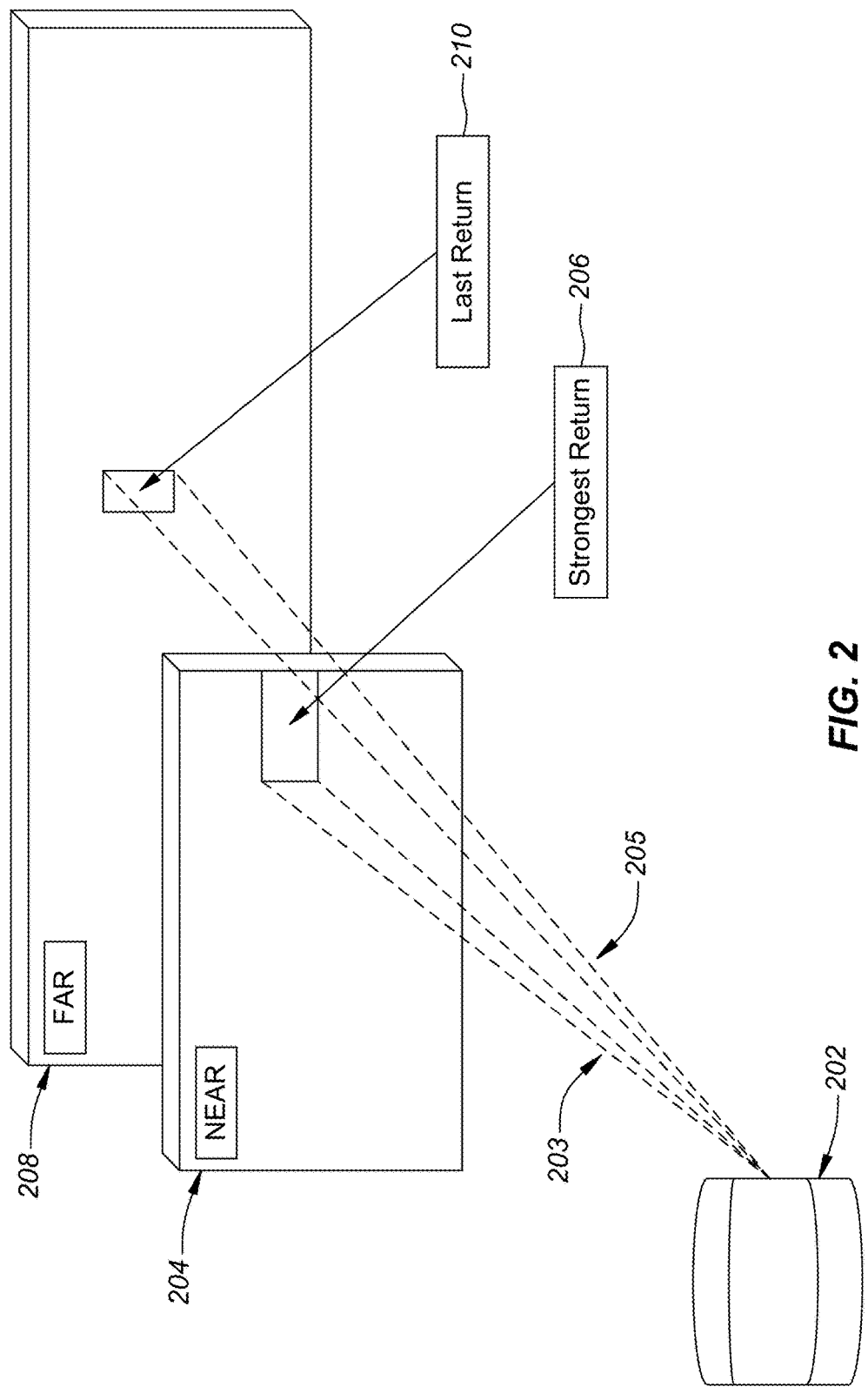
FIG. 2 illustrates the operation of a light detection and ranging system and multiple return light signals according to embodiments of the present document.

FIG. 2 illustrates the operation 200 of light detection and ranging system 202 including multiple return light signals: (1) return signal 203 and (2) return signal 205 according to embodiments of the present document. Light detection and ranging system 202 may be a LIDAR system. Due to the laser's beam divergence, a single laser firing often hits multiple objects producing multiple returns. The light detection and ranging system 202 may analyze multiple returns and may report either the strongest return, the last return, or both returns. Per FIG. 2, light detection and ranging system 202 emits a laser in the direction of near wall 204 and far wall 208. As illustrated, the majority of the beam hits the near wall 204 at area 206 resulting in return signal 203, and another portion of the beam hits the far wall 208 at area 210 resulting in return signal 205. Return signal 203 may have a shorter TOF and a stronger received signal strength compared with return signal 205. Light detection and ranging system 202 may record both returns only if the distance between the two objects is greater than minimum distance. In both single and multiple return LIDAR systems, it is important that the return signal is accurately associated with the transmitted light signal so that an accurate TOF is calculated.

Some embodiments of a LIDAR system may capture distance data in a 2-D (i.e. single plane) point cloud manner. These LIDAR systems may be often used in industrial applications and may be often repurposed for surveying, mapping, autonomous navigation, and other uses. Some embodiments of these devices rely on the use of a single laser emitter/detector pair combined with some type of moving mirror to effect scanning across at least one plane. This mirror not only reflects the emitted light from the diode, but may also reflect the return light to the detector. Use of a rotating mirror in this application may be a means to achieving 90-180-360 degrees of azimuth view while simplifying both the system design and manufacturability.

Figure 3A:
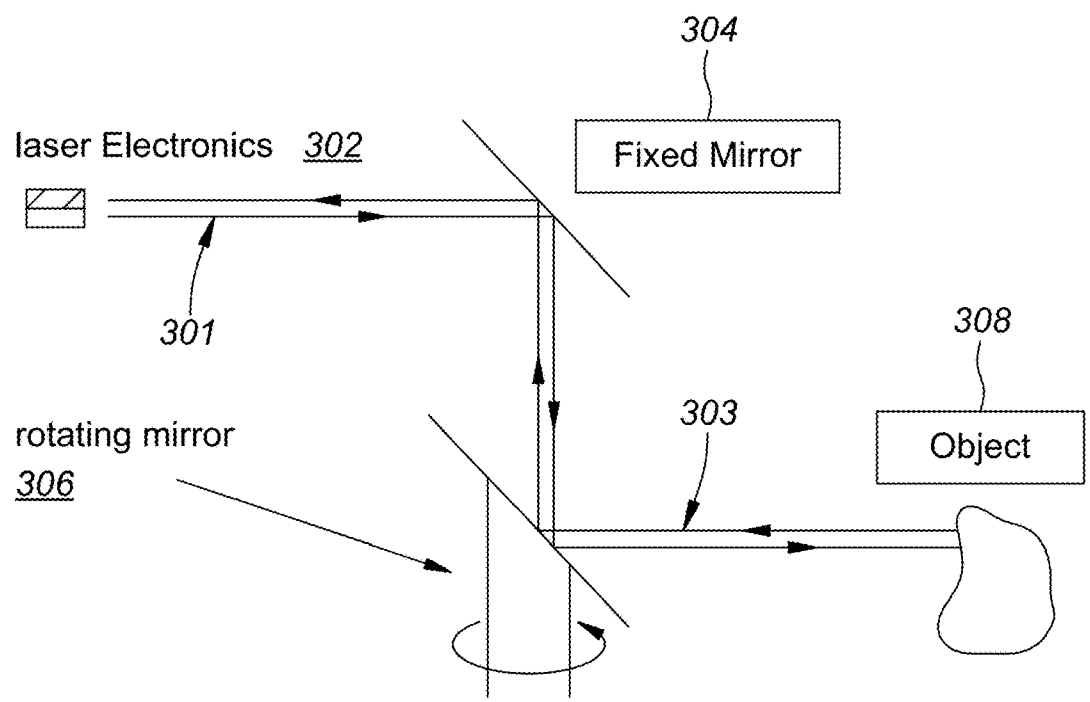
FIG. 3A depicts a LIDAR system with a rotating mirror according to embodiments of the present document.

FIG. 3A depicts a LIDAR system 300 with a rotating mirror according to embodiments of the present document. LIDAR system 300 employs a single laser emitter/detector combined with a rotating mirror to effectively scan across a plane. Distance measurements performed by such a system are effectively two-dimensional (i.e., planar), and the captured distance points are rendered as a 2-D (i.e., single plane) point cloud. In some embodiments, but without limitations, rotating mirrors are rotated at very fast speeds e.g., thousands of revolutions per minute. A rotating mirror may also be referred to as a spinning mirror.

LIDAR system 300 comprises laser electronics 302, which comprises a single light emitter and light detector. The emitted laser signal 301 may be directed to a fixed mirror 304, which reflects the emitted laser signal 301 to rotating mirror 306. As rotating mirror 306 "rotates", the emitted laser signal 301 may reflect off object 308 in its propagation path. The reflected signal 303 may be coupled to the detector in laser electronics 302 via the rotating mirror 306 and fixed mirror 304.

Figure 3B:
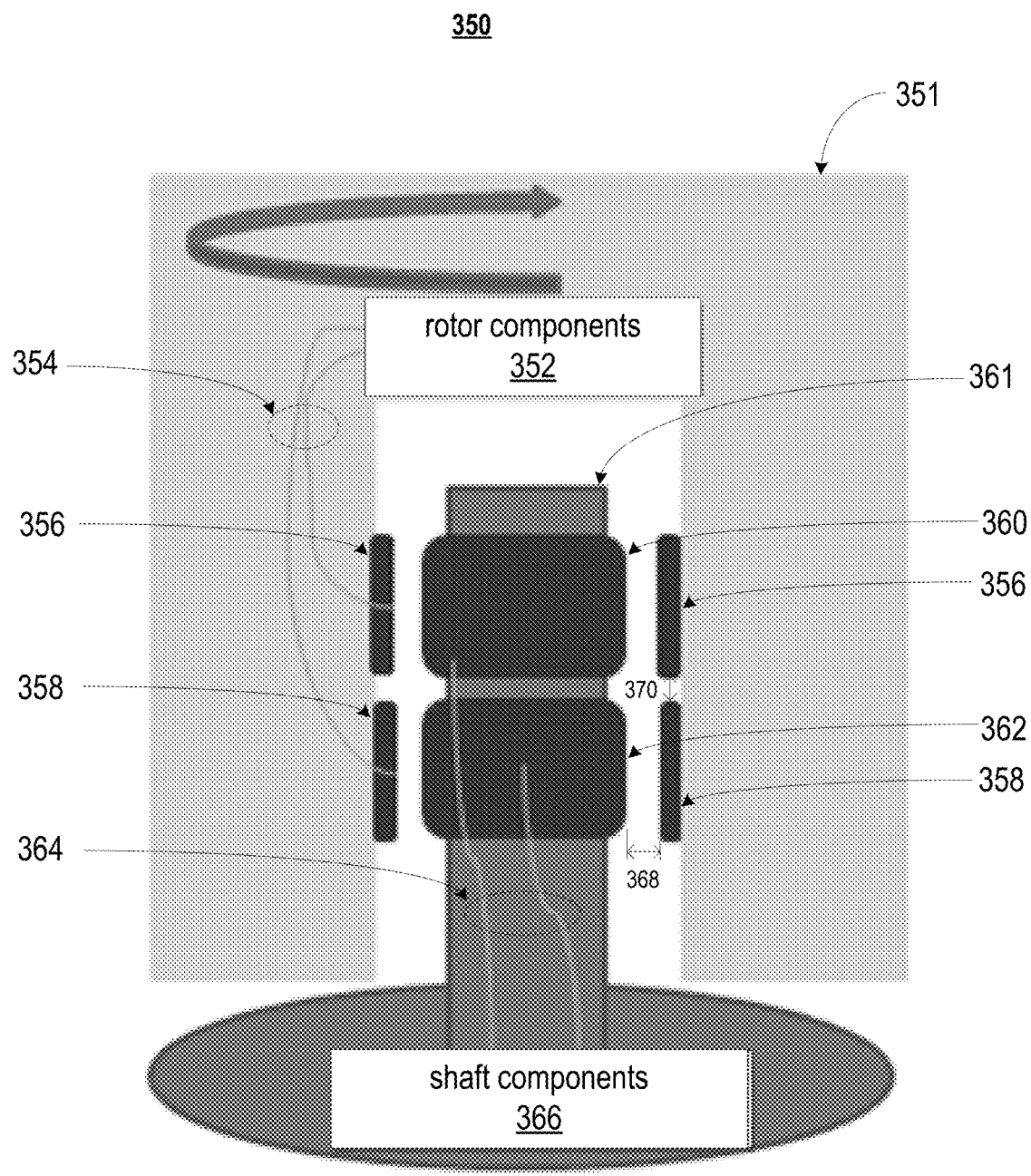
FIG. 3B depicts a LIDAR system with rotating electronics in a rotor-shaft structure comprising a rotor and a shaft according to embodiments of the present document.

FIG. 3B depicts a LIDAR system 350 with rotating electronics in a rotor-shaft structure comprising a rotor 351 and a shaft 361 according to embodiments of the present document. Rotor 351 may have a cylindrical shape and comprise a cylindrical hole in the center of rotor 351. Shaft 361 may be positioned inside the cylindrical hole. As illustrated, rotor 351 rotates around shaft 361. These components may be included in a LIDAR system. Rotor 351 may comprise rotor components 352 and shaft 361 may comprise shaft components 366. Included in rotor components 352 is a top PCB and included in shaft components 366 is a bottom PCB. In some embodiments, rotor components 352 may comprise light detection and ranging components 102 and shaft components 366 may comprise data analysis & interpretation 109 of FIG. 1.

Coupled to rotor components 352 via connections 354 are ring 356 and ring 358. Ring 356 and ring 358 are circular bands located on the inner surface of rotor 351 and provide electrode plate functionality for one side of the air gap capacitor. Coupled to shaft components 366 via connections 364 are ring 360 and ring 362. Ring 360 and ring 362 are circular bands located on the outer surface of shaft 361 and provide electrode plate functionality for the other side of the air gap capacitor. A capacitor C1 may be created based on a space between ring 356 and ring 360. Another capacitor C2 may be created based on a space between ring 358 and ring 362. The capacitance for the aforementioned capacitors may be defined, in part, by air gap 368.

Ring 356 and ring 360 are the electrode plate components of capacitor C1 and ring 358 and ring 362 are the electrode plate components of capacitor C2. The vertical gap 370 between ring 356 and ring 358 may impact the performance of a capacitive link between capacitor C1 and capacitor C2 inasmuch as the value of the vertical gap 370 may determine a level of interference between the two capacitors. One skilled in the art will recognize that rotor 351 and shaft 361 may each comprise N rings that may support N capacitive links.

As previously noted, the time of flight or TOF is the method a LIDAR system uses to map the environment and provides a viable and proven technique used for detecting target objects. Simultaneously, as the lasers fire, firmware within a LIDAR system may be analyzing and measuring the received data. The optical receiving lens within the LIDAR system acts like a telescope gathering fragments of light photons returning from the environment. The more lasers employed in a system, the more the information about the environment may be gathered. Single laser LIDAR systems may be at a disadvantage compared with systems with multiple lasers because fewer photons may be retrieved, thus less information may be acquired. Some embodiments, but without limitation, of LIDAR systems have been implemented with 8, 16, 32 and 64 lasers. Also, some LIDAR embodiments, but without limitation, may have a vertical field of view (FOV) of 30-40° with laser beam spacing as tight as 0.3° and may have rotational speeds of 5-20 rotations per second.

The rotating mirror functionality may also be implemented with a solid state technology such as MEMS.

D. Methods for Mitigating Optical Crosstalk in a LIDAR System

Figure 3C:
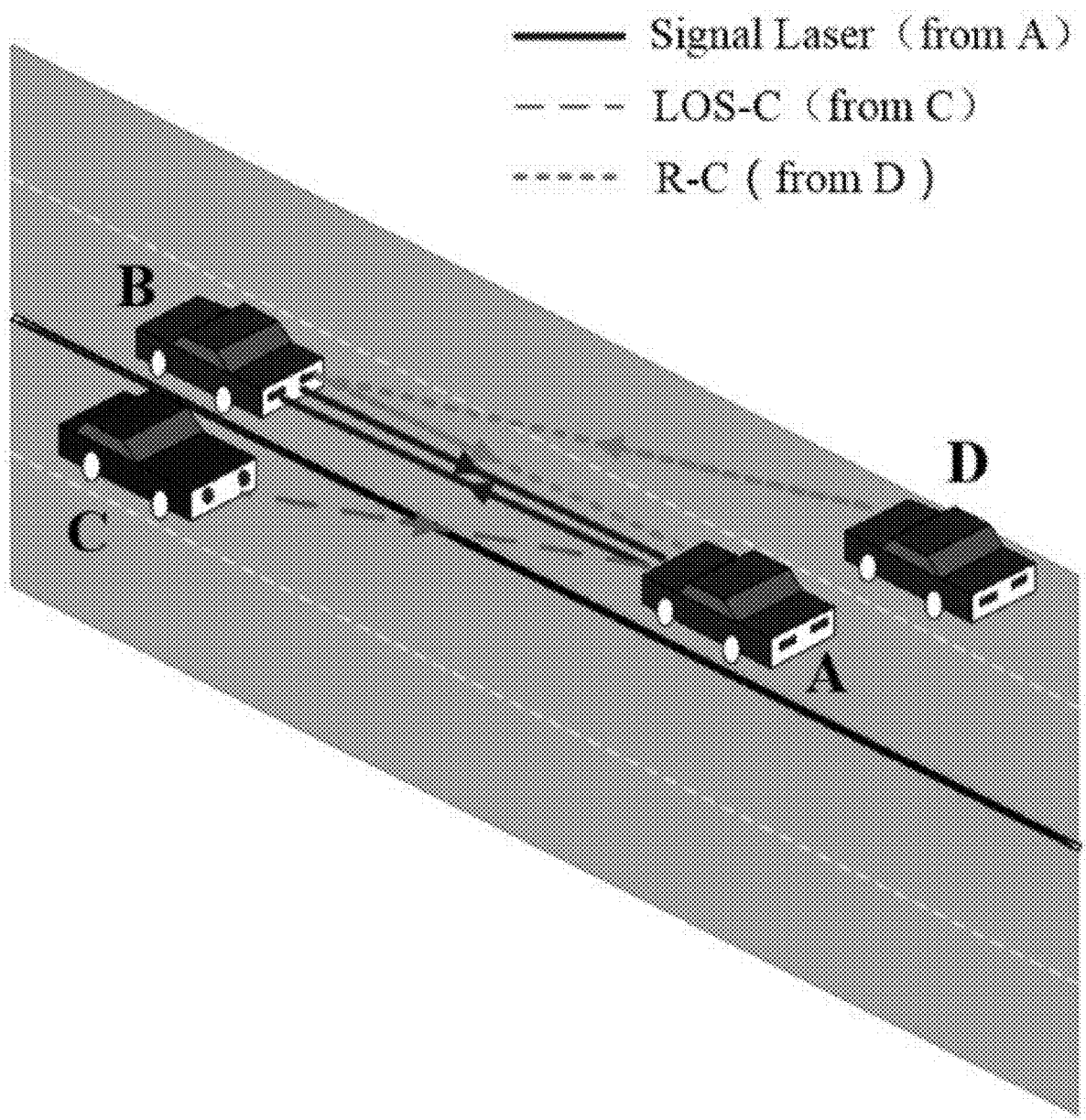
FIG. 3C depicts a crosstalk model with multiple sources according to embodiments of the present invention.

With the growth of LIDAR systems in autonomous driving, optical crosstalk or simply crosstalk may become a significant issue. Crosstalk may also be referred to as mutual interference. FIG. 3C depicts a crosstalk model 380 with multiple sources according to embodiments of the present invention. As illustrated, there are four vehicles on the highway, vehicle A, vehicle B, vehicle C, and vehicle D. The solid line indicates the laser signal generated by vehicle A and reflected off vehicle B. The dashed line indicates the line-of-sight crosstalk (LOS-C) from vehicle C heading in the opposite direction to vehicle A. The dotted line indicates the reflective crosstalk (R-C) from vehicle D heading in the same direction as vehicle A. Not shown in crosstalk model 380 is crosstalk between two LIDAR systems that are co-located on the same vehicle.

Figures 4A, 4B:
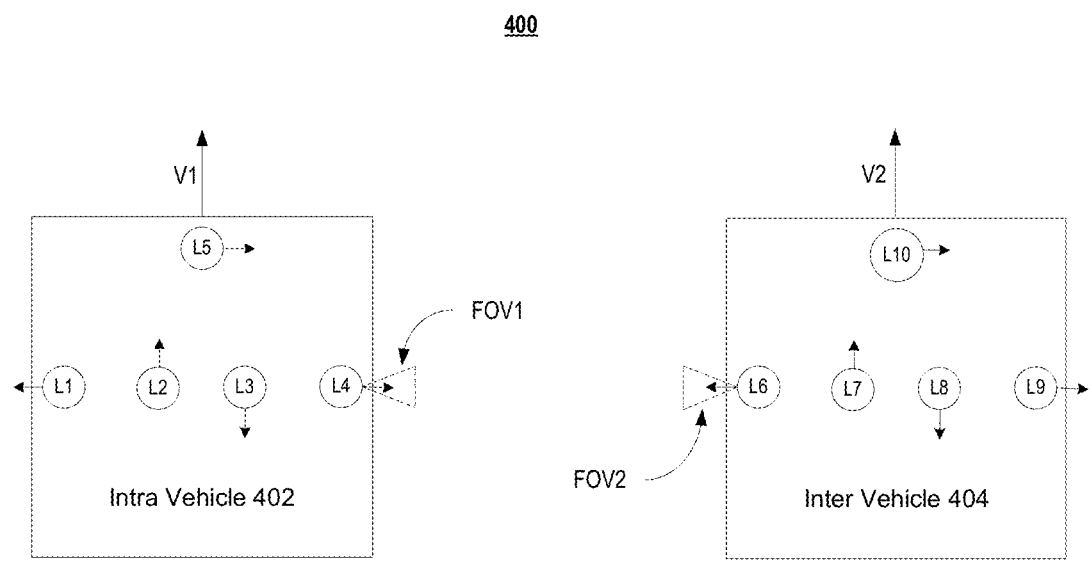
FIG. 4A and FIG. 4B depict an embodiment 400 of two vehicles each with multiple LIDAR systems according to embodiments of the present document.

FIG. 4A and FIG. 4B depict two vehicles each with multiple LIDAR systems according to embodiments of the present document. In FIG. 4A, intra vehicle 402 comprises five LIDAR systems, L1, L2, L3, L4, and L5. The arrow projecting from the circle of L1, L2, L3, L4, and L5 indicates the direction of a laser firing. In proximity to intra vehicle 402 is inter vehicle 404 which also comprises five LIDAR systems. As indicated by crosstalk model 380, intra vehicle 402 and inter vehicle 404 may generate multiple forms of crosstalk. As discussed herein, there may be a number of methods to minimize crosstalk. The methods may include, but without limitation, laser firing phase lock (PV) between LIDAR systems, analysis of a difference between oscillators of LIDAR systems, analysis of a difference of velocity between two vehicles, disregarding or ignoring return signals in a certain field of view (FOV) between two LIDAR systems, and passive/active reception comparisons.

1. Phase Lock (PL)

The phase lock (PV) method or phase locking may be described relative to FIG. 4A and FIG. 4B. The phase locking may be controlled by a computer on a vehicle. With instructions, the computer directs or re-aligns laser firing of LIDAR systems in different directions from one another to mitigate intra vehicle interference. That is, on intra vehicle 402, to the maximum extent possible, point the firing of LIDAR systems L1, L2, L3, L4, and L5 away from each other to minimize intra interference. Otherwise, the laser beams may bounce off each other. As the intra LIDAR systems are rotating, it may be desirable to point the LIDAR systems to a particular encoding position. Per FIG. 4A and FIG. 4B, four of the five laser systems of intra vehicle 402 are each directed in a different direction. On intra vehicle 402, L1, L2, L3 and L4 are directed to fire in different directions, with the angle of separation 90 degrees or 180 degrees. Phase locking may be implemented at other angles of separation. As an angle of separation for a firing direction of two LIDAR systems increases, the mitigation of crosstalk increases for the two LIDAR systems. That is, a greater angle of separation may result is a greater mitigation of intra crosstalk. This method may substantially mitigate intra crosstalk between L1, L2, L3 and L4. L5 is directed in the same direction as L4, but L4 and L5 have a physically separation on intra vehicle 402, which may reduce crosstalk between L4 and L5. The objective for the phase locking is for the five LIDAR systems on intra vehicle 402 to rotate in phase lock such that the angle of separation of the laser firings is maintained. Phase locking may reduce the intra crosstalk by 50-60%.

LIDAR systems on inter vehicle 404, may or may not be able to implement phase locking with LIDAR systems on intra vehicle 402 inasmuch as LIDAR systems L6, L7, L8, L9, and L10 may not be synchronized or in phase lock with LIDAR systems L1, L2, L3, L4, and L5.

2. Field of View (FOV)

The crosstalk between LIDAR systems on different vehicles, such as intra vehicle 402 and an inter vehicle 404, may be mitigated by managing return signals having a particular field of view (FOV). The method may be based on ignoring reception or not transmitting lasers when two LIDAR systems on different vehicles are firing laser beams at each other and they each have a field of view less than a threshold. In one embodiment, two LIDAR systems may disregard, i.e., ignore, received signals from each other when each LIDAR system is firing lasers at the other LIDAR system within a specific field of view or angle range, i.e., field of view threshold. In another embodiment, the LIDAR system may not transmit, i.e., or may stop or suppress laser firing, when a received laser signal is sensed to be within a specific field of view. For example, referring to FIG. 4A and FIG. 4B, L4 and L6 are pointing at each other with field of views, FOV1 and FOV2. FOV1 and FOV2 are each less than a specified field of view or field of view threshold. When this status is determined, L4 and/or L6 may ignore, i.e., not process the reception of the laser signal from the other LIDAR system. This method may mitigate the inter crosstalk for both L4 and/or L6. Alternatively L4 may stop transmitting a laser when the when L4 senses that field of view FOV2 of L6 is less than the field of view threshold, and vice-versa. In some embodiments, the field of view threshold may be ±15 degrees. This field of view method may be implemented separately from other methods described herein. For example, FOV interference reduction may be implement independent of passive/active interference reduction and phasing locking interference reduction.

3. Differences of Oscillator Frequency

Observations related to differences in oscillator frequencies of the LIDAR systems and differences in the velocity of the LIDAR systems may further mitigate crosstalk. The oscillator may be, but without limitation, a crystal oscillator. The oscillator may or may not be synchronized with an external time sources such as GPS, cellar or Wi-Fi.

FIG. 4A may illustrate the difference in the oscillator frequencies for each of the LIDAR systems in intra vehicle 402 compared with the oscillator frequencies of each of the LIDAR systems in inter vehicle 404. For example, the analysis may include a comparison between the oscillator frequencies of L1 compared with L9, etc. With an appropriate adjustments to respective LIDAR systems in intra vehicle 402 and inter vehicle 404 may allow synchronization between these LIDAR systems and may allow implementation of the phase lock method to mitigate crosstalk. This adjustment may be based on, for example, L5 observing L10 and adjusting its oscillator frequency to align with the crystal frequency of L10. There may not be any formal coordination between L5 and L10.

An analysis differences in oscillator frequencies may include observing the timing of the laser firing of a second LIDAR system relative to a first LIDAR system. When the first and second LIDAR systems fire at the same time, the first and second LIDAR systems may be consider an incident event and a specific "blink" rate. Overtime, the first LIDAR system may observe a faster "blink" rate from the second LIDAR system indicating that the second LIDAR system has a different oscillator frequency than the first LIDAR system. Between first and second LIDAR systems there is no coordination or negotiations related to oscillator frequencies. Based on these observations, the first LIDAR system may improve its interference based on its knowledge of the "blink" rate. The blink rate s further discussed relative to FIG. 5C.

The oscillator frequencies of the second LIDAR system are unknown to the first LIDAR system. The objective is to "see" a pattern of interference based on the unknown oscillator speed differences.

Figure 5A:
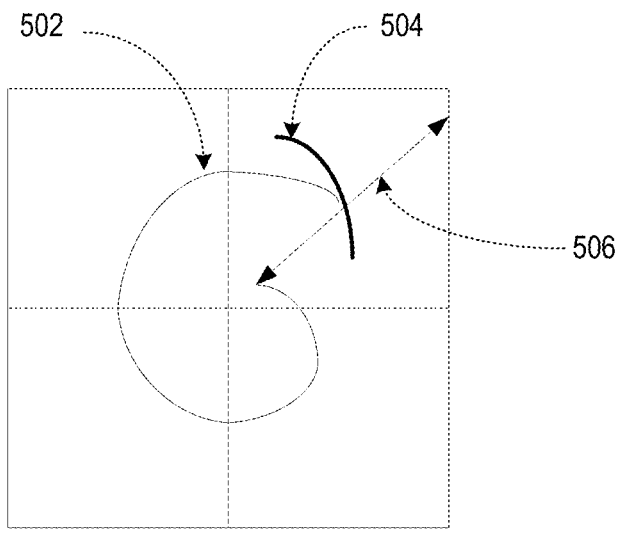
FIG. 5A is a graphical illustration of an interference pattern due to a difference in oscillator frequencies and velocities of two LIDAR systems according to embodiments of the present document.

FIG. 5A is a graphical illustration of an interference pattern 500 due to a difference in oscillator frequencies or difference in velocities of two LIDAR systems according to embodiments of the present document. Interference pattern 500 may illustrate movement of interference or an interference cluster. Some aspects of Interference pattern 500 included the following: Interference clusters appear to move towards and away from a sensor. Interference cluster may form an arc (equal radius) from the center of the sensor. Azimuth and multiple patterns of interferences clusters vary by rotational RPM.

A delta in oscillator frequencies may be analyzed via an x-y mapping of oscillator frequencies of two sensors to generate the interference pattern 500. FIG. 5A indicates that interference clusters may move away from one sensor and towards the other sensor depending on $f_{CLK\_A}$ versus $f_{CLK\_B}$. The speed of the interference clusters may be proportional to $\Delta f = f_{CLK\_A} - f_{CLK\_B}$. If $\Delta f = 0$, the interference clusters may remain stationary. Under some conditions, interference cluster pattern 502 indicates there is a difference between $f_{CLK\_A}$ and $f_{CLK\_B}$. Under other conditions, when $\Delta f = 0$, an interference arc 504 is formed and is static in in interference pattern 500. If the $\Delta f \neq 0$, then interference arc 504 moves in our out, as indicated by dotted line 506. This is discussed further in relative to FIG. 5B. The interference pattern 500 may be useful to make appropriate adjustments to mitigate crosstalk.

Figure 5C:
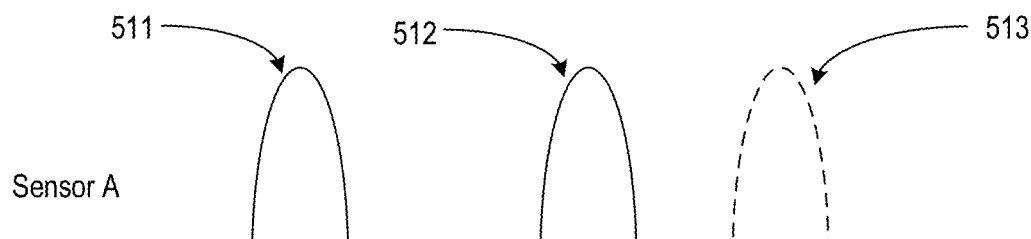
FIG. 5C depicts observed laser signals at Sensor A and Sensor B according to embodiments of the present disclosure.
Figure 5C:
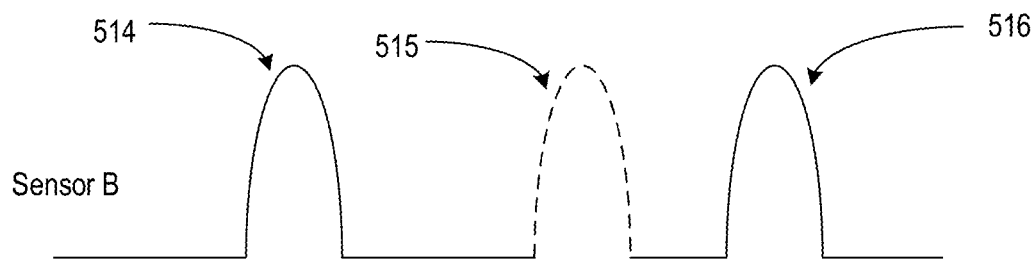
Figure 5B:
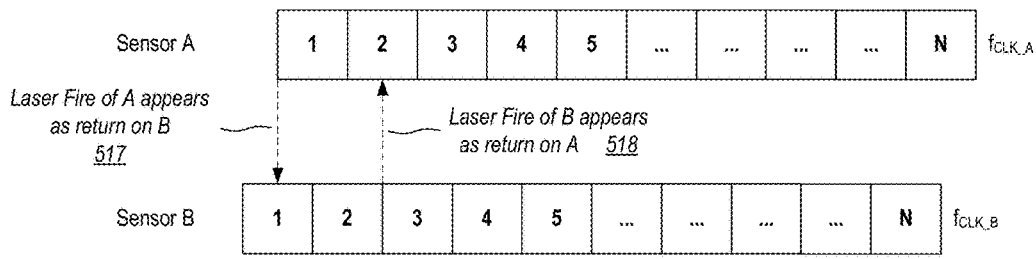
FIG. 5B depicts a timing pattern for two LIDAR systems according to embodiments of the present document.

FIG. 5B depicts a timing patterns 510 for two LIDAR systems comprising Sensor A and Sensor B, according to embodiments of the present document. Sensor A has a clock frequency of $f_{CLK\_A}$ and Sensor B has a clock frequency of $f_{CLK\_B}$. The timing patterns indicate the frames in the timing pattern with timeslots 1-N. In some embodiments, associated with each frame may be a laser position firing time (LPOS), indicated by a vertical line adjacent to the frame.

Also indicated on FIG. 5B is (1) the laser fire of Sensor A appearing as a return on the timing diagram of Sensor B (517), and (2) the laser fire of Sensor B appearing as a return on the timing diagram of Sensor A (518). The timing differences, i.e., the delta of the oscillator frequencies, may generate crosstalk between Sensor A and Sensor B.

FIG. 5C depicts observed laser signals at Sensor A and Sensor B according to embodiments of the present disclosure. At Sensor A, signal 511 and signal 512 are known signals of Sensor A. By observation, signal 513 is a crosstalk signal from Sensor B. The blink rate of signal 511, signal 512, and signal 513 may not match the known signaling pattern of Sensor A. Similarly, at Sensor B, signal 514 and signal 516 are known signals of Sensor A. By observation, signal 514 is a crosstalk signal from Sensor B. The blink rate of signal 514, signal 515, and signal 516 does not match the known signaling pattern of Sensor B. From these observations, Sensor A may deleted signal 513 from its signal pattern, and Sensor B may deleted signal 515 from its signal pattern.

As an analogy, Sensor A and Sensor B may be lighthouses. When located at Sensor A, the blinking from Sensor B may be observed. From this observation, blinks that are viewed from Sensor B, but not in Sensor A may be ignored.

4. Difference in Velocity

An additional consideration to allow improvements in mitigating crosstalk utilizing the PV method may include an analysis of the delta in the speed between the each of the LIDAR system of intra vehicle 402 and each of the LIDAR systems of inter vehicle. Per FIG. 4A and FIG. 4B, intra vehicle 402 and inter vehicle 404 may have speeds of V1 and V2 respectively. A difference in these speeds may contribute to crosstalk for intra vehicle 402 and inter vehicle 404. A difference of V1 and V2 reflecting a movement between intra vehicle 402 and inter vehicle 404 may cause changes in the interference pattern 520. An appropriate adjustment based on the difference in the difference of V1 and V2 may mitigate the crosstalk.

5. Passive States and Active States

A method for mitigating crosstalk utilizing passive and active states may be based on the principle of comparing the signal returns of 1) a passive state where the LIDAR system is receiving returns, but not firing its lasers, and 2) an active state where the LIDAR system is receiving returns and firing its lasers. In an active return, a LIDAR system receives normal returns during a normal operation. The LIDAR system fires and returns are captured immediately thereafter. In a passive return, a LIDAR system captures returns in a LPOS cycles without laser stimulation by the LIDAR system. The captures returns in a passive state are from other optical sources. These sources may be other LIDAR systems. Thus, in the passive return, interference is received by the LIDAR system. In the active return, interference and "real" return signals based on the LIDAR systems laser firing are received. In the active return, interference may be removed based on the comparison between the passive return and active return. Effectively, during the passive state, a mold is defined, which a LIDAR system may utilize to filter out the interference received in the active state. The period of time for the active state may be referred to as an active cycle. The period of time for the passive state may be referred to as a passive cycle.

Figure 6A:
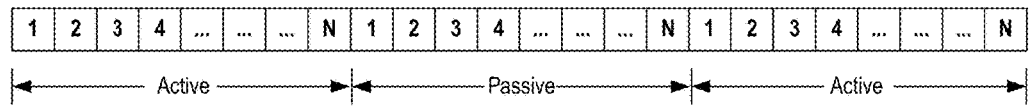
FIG. 6A depicts a timing pattern for laser firing of a LIDAR system cycling between a passive state to an active state according to embodiments of the present document.

FIG. 6A depicts a timing pattern 600 for a laser firing of a LIDAR system cycling between a passive state to an active state according to embodiments of the present document. When in the passive state (or cycle), laser firing by the LIDAR system is suppressed. During the active state (or cycle) the laser firing by the LIDAR system is "active". This includes suppressing laser power control feedback so that passive cycles do not affect laser power setting of active cycles. Per timing pattern 600, laser power may only be calculated and adjusted for active cycles.

Figure 6B:
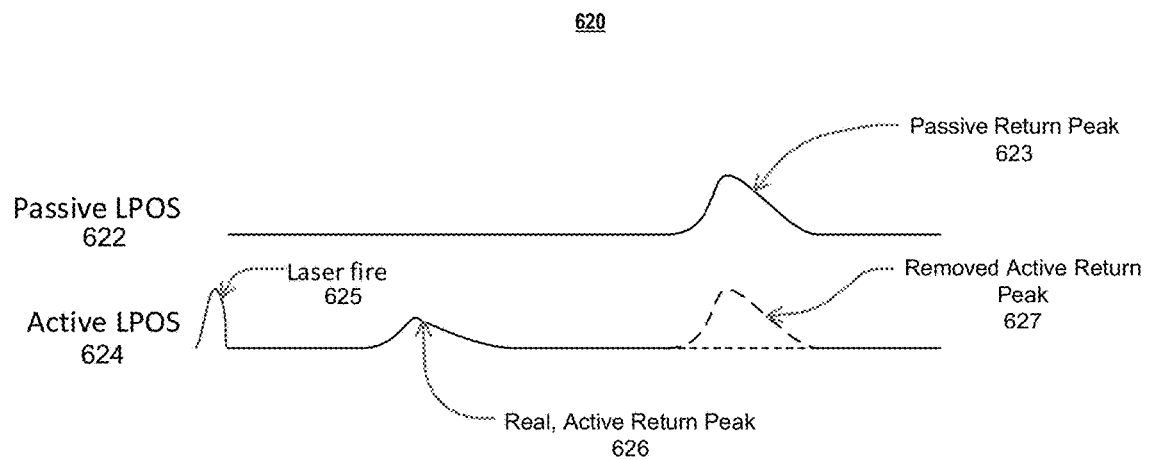
FIG. 6B is a graphical illustration of a passive and active returns according to embodiments of the present document.

FIG. 6B is a graphical illustration of a passive and active returns 620 according to embodiments of the present document. The passive return is indicated by Passive LPOS 622. Passive LPOS 622 illustrates detection by a first LIDAR system of a passive return peak 623, i.e., a return from a second LIDAR system. The active return is indicated by Active LPOS 624, where LPOS is the laser position firing time. Active LPOS 624 illustrates a laser fire 625 from the first LIDAR system, a real active return 626 based on the laser fire 625 of the first LIDAR system, and removal of an active return peak 627 (artifact) that was based on the passive return peak 623 from the second LIDAR system.

In one embodiment, a Notch filter operation, the first LIDAR system may occasionally sample the passive returns. The first LIDAR system may be implemented with a selective notch filter in firmware to filter any returns that may lie on the same radius as the received passive returns, or detected passive returns. The artifact may be removed from the next active capture. The Notch filter operation must detect and predict the next interference return, i.e., the next interference cluster pulse.

In another embodiment, in a consumer based process operation, a LIDAR system alternatively samples and passes returns with active ones for each firing cycle. That is, the LIDAR system repeats a cycle of passive state and active state execution to further mitigate crosstalk. Passive returns may hint at where interference clusters may appear on active return captures. The consumer process may recognize, filter, track and ignore selected active returns. Consumer refers to customer system handling processing.

In some embodiments previously discussed, the interference, e.g., passive return peak 623, may be detected during the passive cycle, and may be removed during the active cycle, e.g., removed from the received return signal, Active LPOS 624. In some other embodiments, the interference may be deleted directly from the active return as described in the following configurations:

In-Acquisition—As data is collected, the LIDAR system may selectively remove the interference directly from the return.

Post-Acquisition or post storage—Collect a number of returns and store the data including a location. For example, return 1 is at x1, return 2 is at x2, and x1 is at y1; if can correlate x1 and y1, then x2 may be selected.

Post Return—Upon returning, given x1 or x2; given y1; if can correlate x1 and y1, then remove x2. In this case the data for x2 is lost.

Another embodiment may apply a random and varying timeslot shift with between intra systems. This random shift may create an appearance of solid interference cluster to break apart and lessen relevance in post processing.

E. LIDAR Systems for Mitigating Optical Crosstalk

Figure 7A:
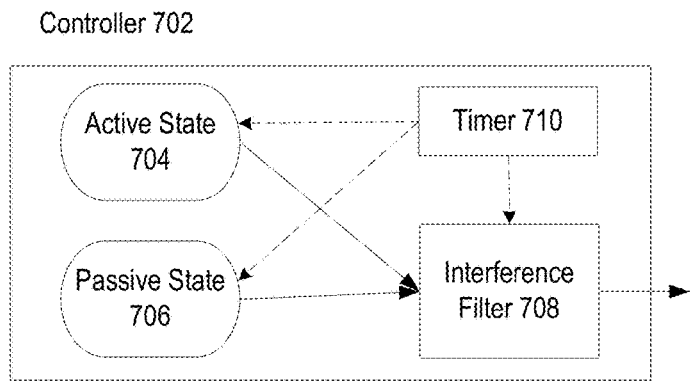
FIGS. 7A, 7B, and 7C depicts block diagrams of a controller, a passive detector, and an active detector according to embodiments of the present document.
Figure 7B:
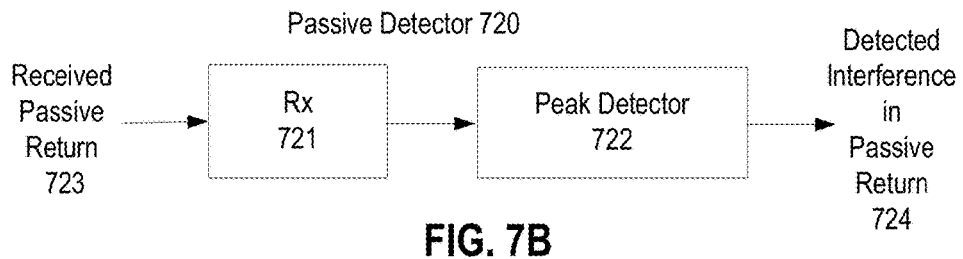
Figure 7C:
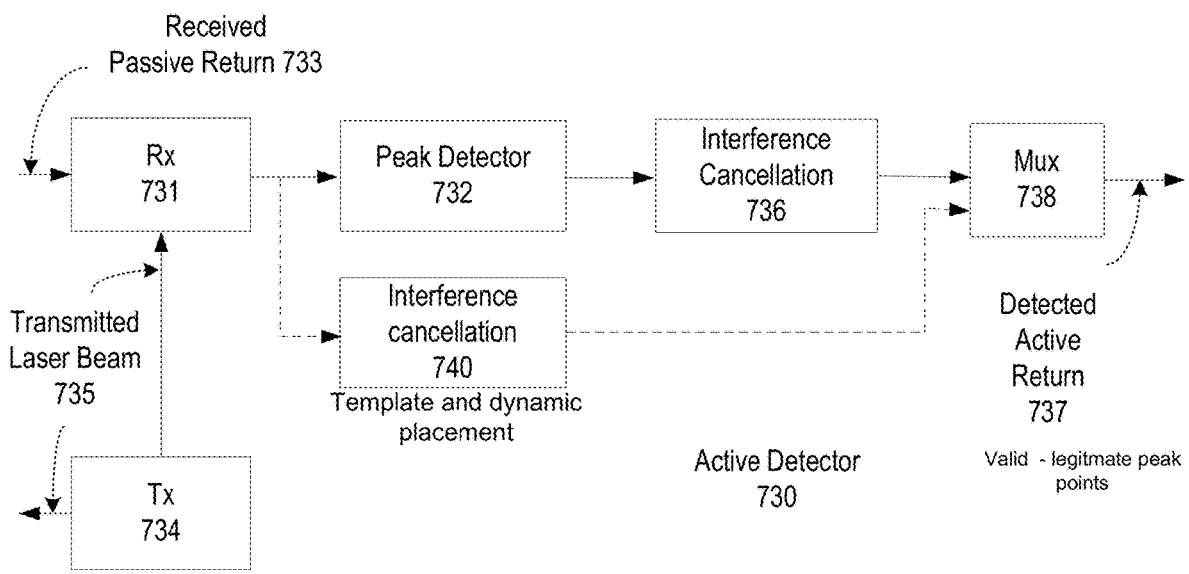

FIGS. 7A, 7B, and 7C depicts block diagrams 700 of a controller 702, a passive detector 720, and an active detector 730, respectively, according to embodiments of the present document. Controller 702 may control the functions of active state 704 and passive state 706, which are coupled timer 710. The outputs of active state 704 and passive state 706 are coupled to interference filter 708, which in turn generates an output for other LIDAR system functions.

Passive detector 720 may comprise receiver Rx 721 and Peak Detector 722. Receiver Rx 721 receives a passive return 723 and after processing, couples the output of receiver Rx 721 to peak detector 722. Peak detector 722 generates detected passive return 724, which may include interference signals and peaks. An example of detected passive return 724 may be Passive LPOS 622 of FIG. 6B.

Active detector 730 may comprise receiver Rx 731, peak detector 732, interference cancellation 736, Mux 738, interference cancellation 740, and transmitter Tx 734. The inputs to receiver Rx 731 include received passive return 733 and a transmitted laser beam 735, which is the output from transmitter Tx 734, which comprises a LIDAR laser firing. In one mode of operation, the output of receiver Rx 721 may be coupled to peak detector 732, which in turn is coupled to interference cancellation 736, which in turn generates an output, detected active return 737 via Mux 738. Interference from received passive return 733 may be removed in detected active return 737. An example of detected active return 737 may be Active LPOS 624 the interference from received passive return 733. Alternatively, the output of receiver Rx 721 may be coupled to interference cancellation 740. Interference cancellation 740 includes a template and dynamic placement. The output of interference cancellation 740 generates detected active return 737 via Mux 738. [DG-review]

Active detector 730 may be operable to generate, in the active state, an active return comprises a return signal based on the transmitted laser beam 735 of the LIDAR system and interference signals. The interference signals are subsequently removed A vehicle, comprising two or more LIDAR systems, may comprise a computer to direct and coordinate operations of the two or more LIDAR systems. In one example, but without limitation, the coordination of intra LIDAR systems to implement phase locking may be managed by the computer.

F. Methods for Mitigating Optical Crosstalk in a LIDAR System

Figure 8A:
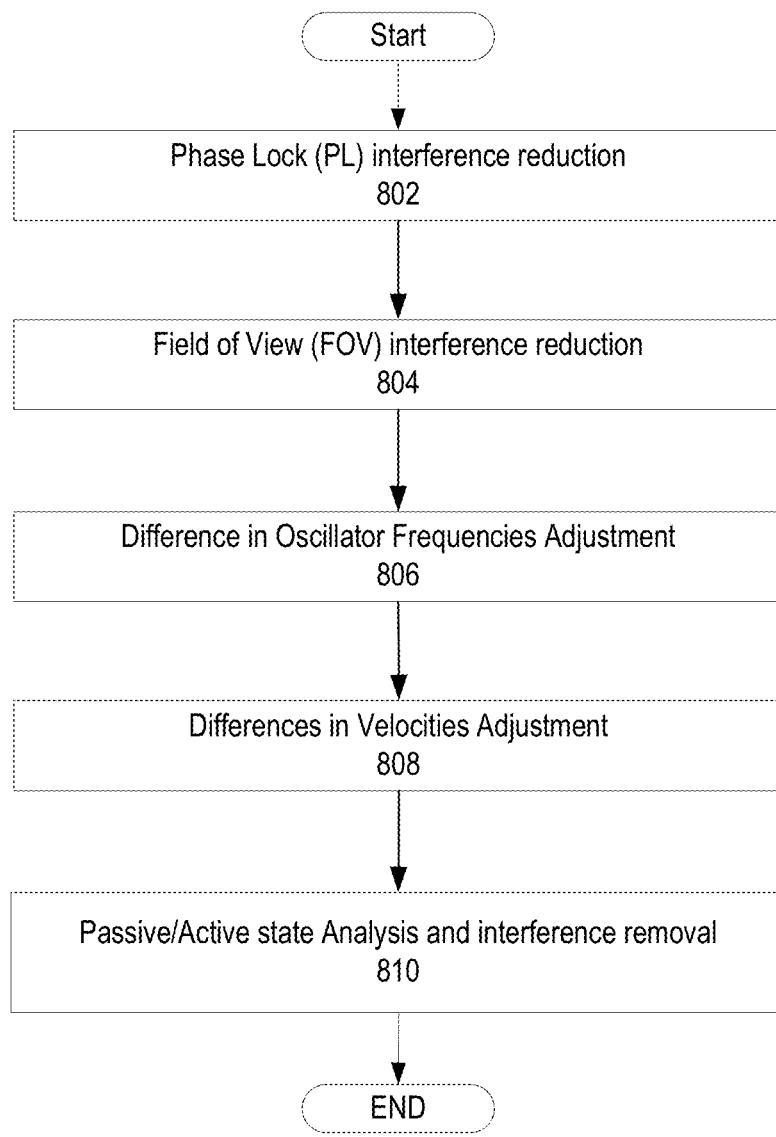
FIG. 8A depicts a flowchart for a method of mitigating crosstalk in a LIDAR system according to embodiments of the present document.

FIG. 8A depicts a flowchart 800 for a method of mitigating optical crosstalk in a LIDAR system according to embodiments of the present document. The method may comprise the following steps:

Phase Lock—Phase locking the direction of laser firing on LIDAR systems located on the same vehicle in different direction. The greater the different direction, the greater the reduction of intra crosstalk. As an example, but without limitation, different direction may be 90 degrees or 180 degrees. Phase locking may be controlled by a computer on the vehicle or at a remote site. Hence, the computer may mitigate intra vehicle crosstalk by phase locking two or more LIDAR systems on a vehicle to cause their lasers to fire with different angles of separation from each other. As an angle of separation increases, the reduction of crosstalk may increase. (step 802)

Field of View—A field of view crosstalk reduction may result by ignoring (or disregarding) returns when two LIDAR system lasers are pointing at one another and they have a FOV less than a field of view threshold. Alternatively, stopping the laser firing when two LIDAR system lasers are pointing at one another and they have a FOV of ±15 degrees. In one embodiment, the field of view threshold may be ±15 degrees. (step 804)

Difference in oscillator frequencies—A reduction in crosstalk in an active return may result when a difference in oscillator frequencies between two LIDAR systems is observed. The difference may be observed on an interference pattern. The reduction may be based on selectively removing interference peaks based on the interference pattern observation. (step 806)

Difference in velocities—A reduction in crosstalk in active return may result when a difference in velocity between two LIDAR systems is observed. The difference may be observed on an interference pattern. The reduction may be based on selectively removing interference peaks based on the interference pattern observations. (step 808)

Passive/Active State—Operating the LIDAR system in a passive state, wherein in the passive state the LIDAR system does not transmit laser signals while receiving return signals from other optical sources, e.g., other LIDAR systems. Subsequently, operating the LIDAR system in an active state, wherein in the active state the LIDAR system has laser firings and receives return signals comprising returns based on the laser firings of the LIDAR system and from the other optical sources. Comparing the passive return with the active returns to determine the interference elements in the active return. Removing from the active return the one or more returns from the other LIDAR systems comprising interference elements based on the comparison. (step 810)

Figure 8B:
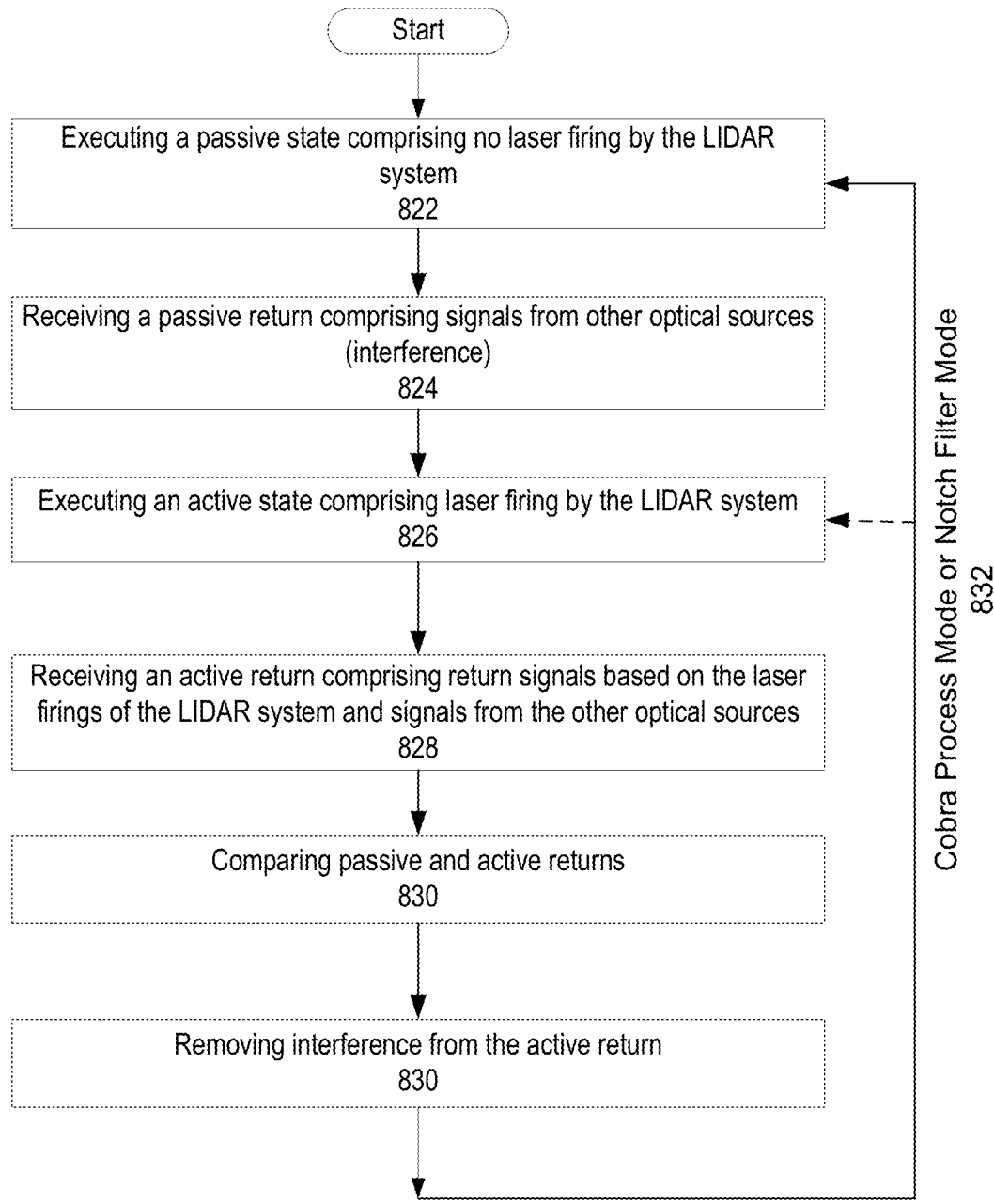
FIG. 8B depicts a flowchart for a method of mitigating crosstalk in a LIDAR system based on passive and active states according to embodiments of the present document.

FIG. 8B depicts a flowchart 820 for a method of mitigating crosstalk in a LIDAR system based on passive and active states according to embodiments of the present document. The method comprise the steps of:

Initiating a passive state comprising no laser firing by the LIDAR system. (step 822)

Receiving a passive return comprising signals from other optical sources (interference). (step 824)

Initiating an active state comprising laser firing by the LIDAR system. (step 826)

Receiving an active return comprising return signals based on the laser firings of the LIDAR system and signals from the other optical sources. (step 828)

Comparing passive return and active return. (step 830)

Removing interference from the active return. (step 830)

With the consumer based process mode, repeating a cycle of passive state and active state execution to further mitigate crosstalk. With the notch filter mode, occasionally sampling passive returns before executing active returns (step 832)

In summary, a method for mitigating crosstalk in a network for a LIDAR network comprising intra vehicle LIDAR systems and inter vehicle LIDAR systems comprises phase locking intra vehicle LIDAR systems, executing a field of view reduction for pairs of inter vehicle LIDAR systems; executing a sequence of passive states and active states for each LIDAR system.

The phase locking intra vehicle LIDAR systems comprises directing a laser of each of the intra vehicle LIDAR systems to fire in a different direction from other intra vehicle systems. That is, a computer may mitigate intra vehicle crosstalk by phase locking two LIDAR systems on a vehicle causing their lasers to fire in different directions from each other. When a pair of inter vehicle LIDAR systems are firing their laser beams at each other within a field of view threshold, the pair of inter vehicle LIDAR systems mutually ignore respective return signals.

For each of the intra vehicle LIDAR systems and the inter vehicle LIDAR system: 1) receiving, during the passive state by each of the LIDAR systems, a passive return comprising one or more returns from other optical sources. A passive state comprises a suppression of a laser firing by the LIDAR system; 2) receiving, during the active state by the each of the LIDAR systems, an active return comprising the returns cause by the laser firing of the each of the LIDAR system and the one or more returns from the other optical sources; 3) comparing, by the each of the LIDAR systems, the passive return and the active return; and 4) removing, by the each of the LIDAR systems, from the active return, the one or more returns from the other optical sources included in the passive return to mitigate crosstalk.

G. Results

It shall be noted that these experiments and results are provided by way of illustration and were performed under specific conditions using a specific embodiment or embodiments; accordingly, neither these experiments nor their results shall be used to limit the scope of the disclosure of the current patent document.

Observations from experiments may suggest the following: For the consumer based process mode, the implementation appears to be at a lower level of complexity and relatively straight-forward to implement. The consumer based process mode may have to sacrifice many active LPOS captures in order to provide useful passive data. Also, the consumer based mode may turn interference clusters into shadows.

For the notch filter mode, the interference cluster tracking may result from LPOS to LPOS. This means the LIDAR system may be able to filter out interference as a first stage from an ADC. Multiple interference clusters may be able to be tracked. Alternatively, the LIDAR system may remove a valid return overlapping with interference clusters. The notch filter mode may turn interference clusters into shadows. Also, the notch filter mode may need to track and predict interference cluster movement across LPOS samples.

H. System Embodiments

In embodiments, aspects of the present patent document may be directed to or implemented on information handling systems/computing systems. For purposes of this disclosure, a computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, a computing system may be a personal computer (e.g., laptop), tablet computer, phablet, personal digital assistant (PDA), smart phone, smart watch, smart package, server (e.g., blade server or rack server), a network storage device, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 9:
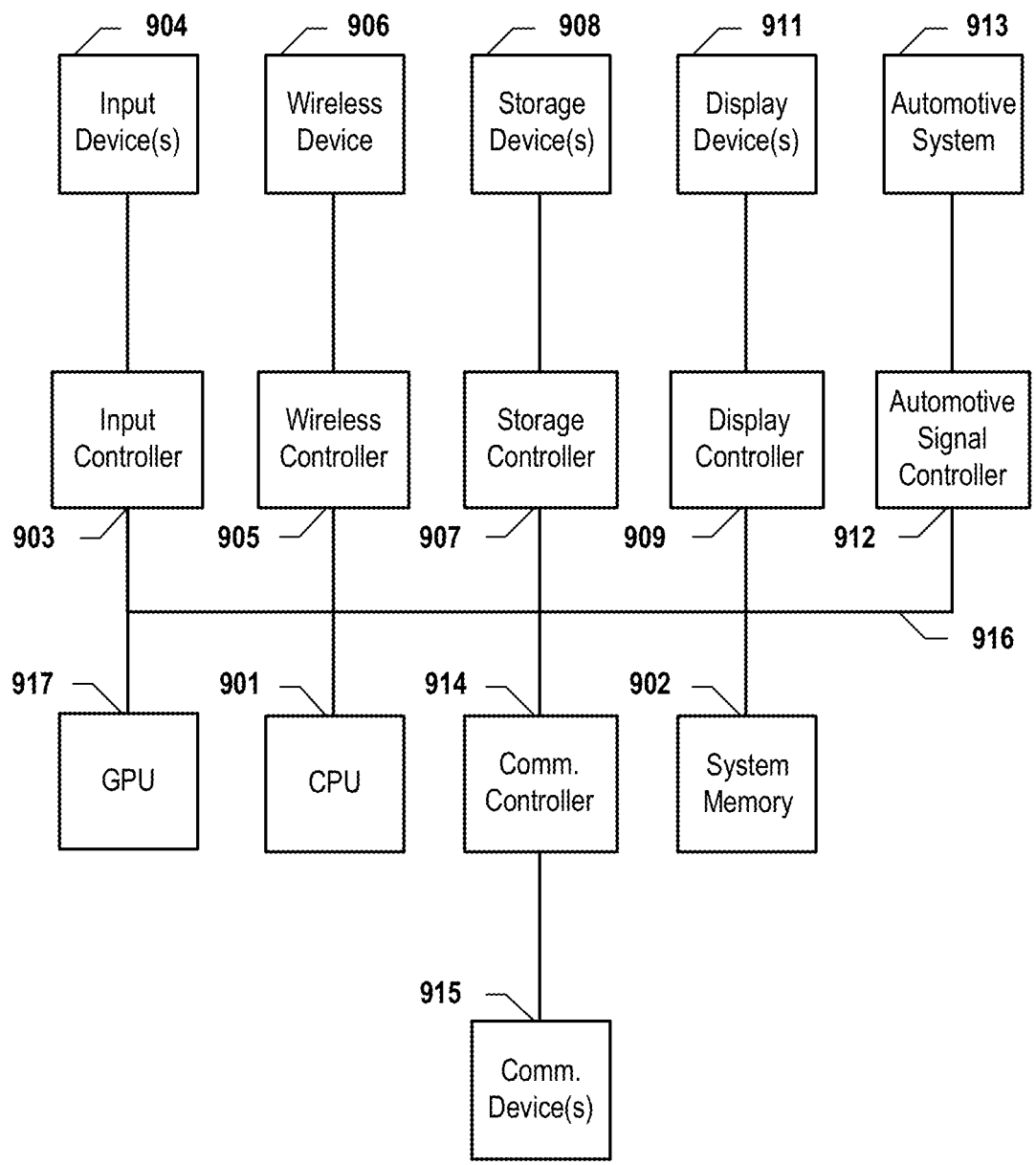
FIG. 9 depicts a simplified block diagram of a computing device/information handling system, in accordance with embodiments of the present document.

FIG. 9 depicts a simplified block diagram of a computing device/information handling system (or computing system) according to embodiments of the present disclosure. It will be understood that the functionalities shown for system 900 may operate to support various embodiments of an information handling system—although it shall be understood that an information handling system may be differently configured and include different components.

FIG. 9 depicts a simplified block diagram of a computing device/information handling system (or computing system) according to embodiments of the present document. It will be understood that the functionalities shown for system 900 may operate to support various embodiments of an information handling system—although it shall be understood that an information handling system may be differently configured and include different components.

As illustrated in FIG. 9, system 900 includes one or more central processing units (CPU) 901 that provides computing resources and controls the computer. CPU 901 may be implemented with a microprocessor or the like, and may also include one or more graphics processing units (GPU) 917 and/or a floating point coprocessor for mathematical computations. System 900 may also include a system memory 902, which may be in the form of random-access memory (RAM), read-only memory (ROM), or both.

A number of controllers and peripheral devices may also be provided, as shown in FIG. 9. An input controller 903 represents an interface to various input device(s) 904, such as a keyboard, mouse, or stylus. There may also be a wireless controller 905, which communicates with a wireless device 906. System 900 may also include a storage controller 907 for interfacing with one or more storage devices 908 each of which includes a storage medium such as flash memory, or an optical medium that might be used to record programs of instructions for operating systems, utilities, and applications, which may include embodiments of programs that implement various aspects of the present invention. Storage device(s) 908 may also be used to store processed data or data to be processed in accordance with the invention. System 900 may also include a display controller 909 for providing an interface to a display device 911. The computing system 900 may also include an automotive signal controller 912 for communicating with an automotive system 913. A communications controller 914 may interface with one or more communication devices 915, which enables system 900 to connect to remote devices through any of a variety of networks including an automotive network, the Internet, a cloud resource (e.g., an Ethernet cloud, an Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 916, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A method comprising:
performing, by a first LIDAR system, operations including:
initiating a passive state, wherein laser firing by a plurality of lasers of the first LIDAR system is suppressed;
receiving, during the passive state, by a passive LIDAR detector of the first LIDAR system, a passive LIDAR return comprising one or more first optical returns from one or more optical sources other than the plurality of lasers;
initiating an active state, wherein the first LIDAR system fires at least one laser included in the plurality of lasers;
receiving, during the active state, by an active LIDAR detector of the first LIDAR system, an active LIDAR return comprising one or more second optical returns corresponding to the firing of the at least one laser and one or more third optical returns from the other optical sources;
suppressing firing of the plurality of lasers of the first LIDAR system when a second LIDAR system is within a field of view of the first LIDAR system, the field of view of the first LIDAR system being less than a field of view threshold,
comparing a passive signal generated by the passive LIDAR detector based on the passive LIDAR return and an active signal generated by the active LIDAR detector based on the active LIDAR return; and
based on the comparing of the passive signal and the active signal, removing, from the active signal, at least a portion of interference corresponding to one or more peaks of the one or more third optical returns from the other optical sources.

2. The method of claim 1, wherein the first and second LIDAR systems are disposed on a vehicle, and wherein the method further comprises:
by a computer, mitigating crosstalk between the first and second LIDAR systems by phase locking the first and second LIDAR systems to cause one or more lasers of the first LIDAR system to fire in a first direction and to cause one or lasers of the second LIDAR system to fire in a second direction different from the first direction.

3. The method of claim 2, wherein as an angle of separation increases-between the first direction and the second direction, mitigation of crosstalk increases for the first and second LIDAR systems.

4. The method of claim 2, wherein the phase locking mitigates the crosstalk by 50% or more.

5. The method of claim 1, wherein the one or more optical sources comprise one or more lasers of the second LIDAR system or of a third LIDAR system.

6. The method of claim 1, wherein the first LIDAR system is disposed on a first vehicle and the second LIDAR system is disposed on a second vehicle, and wherein the operations further comprise:
performing field of view (FOV) interference reduction by disregarding reception of a signal emitted by the second LIDAR system when the second LIDAR system is within the field of view of the first LIDAR system.

7. The method of claim 6, wherein the field of view threshold is ±15 degrees.

8. The method of claim 6, wherein the field of view (FOV) interference reduction is implemented independent of passive/active interference reduction and phase locking interference reduction.

9. The method of claim 1, wherein
removing, from the active signal, at least a portion of interference corresponding to the one or more third optical returns from the other optical sources comprises removing, from the active signal, at least a portion of interference corresponding to one or more peaks of the one or more third optical returns from the other optical sources.

10. The method of claim 9, wherein the operations further comprise:
removing one or more interference peaks from the active signal based on a difference between an oscillator frequency of the first LIDAR system and an oscillator frequency of another LIDAR system.

11. The method of claim 9, wherein the operations further comprise:

removing one or more interference peaks from the active signal based on a difference between a velocity of the first LIDAR system and a velocity of another LIDAR system.

12. The method of claim 1, wherein the operations further comprise:
operating in a notch filter mode, wherein in the notch filter mode, the first LIDAR system samples a plurality of passive signals, creates a selective notch filter for any signal that lies on a same radius as at least one of the plurality of passive signals on an interference pattern, and removes one or more artifacts from a subsequently generated active signal.

13. The method of claim 1, wherein the operations further comprise:
operating in a process mode, wherein in the process mode, the first LIDAR system alternatively samples and passes passive signals with active signals for each firing cycle.

14. A LIDAR system comprising:
a plurality of lasers;
a passive LIDAR detector;
an active LIDAR detector; and
a controller operable to manage a passive state and an active state of the LIDAR system,
wherein in the passive state, the LIDAR system is configured to (i) suppress laser firing by the plurality of lasers and (ii) receive, by the passive LIDAR detector, a passive return comprising one or more first optical returns from one or more optical sources other than the plurality of lasers,
wherein in the active state, the LIDAR system is configured to (i) fire at least one laser included in the plurality of lasers and (ii) receive, by the active LIDAR detector, an active return comprising one or more second optical returns corresponding to the firing of the at least one laser and one or more third optical returns from the other optical sources,
wherein the LIDAR system is a first LIDAR system and is configured to suppress firing of the plurality of lasers when a second LIDAR system is within a field of view of the first LIDAR system, the field of view of the first LIDAR system being less than a field of view threshold,
wherein the passive LIDAR detector is operable to generate, in the passive state and based on the passive return, a passive signal, and
wherein the active LIDAR detector is operable (i) to generate, in the active state and based on the active return, an active signal, (ii) to compare the passive signal and the active signal, and (iii) based on the comparing of the passive signal and the active signal, to remove, from the active signal, at least a portion of interference corresponding to one or more peaks of the one or more third optical returns from the other optical sources.

15. The system of claim 14, wherein the passive LIDAR detector comprises a receiver coupled to a peak detector.

16. The system of claim 14, wherein the active LIDAR detector comprises a receiver coupled to a peak detector, the peak detector being coupled to an interference cancellation module.

17. A method comprising:
for a LIDAR network comprising a plurality of intra vehicle LIDAR systems and at least two inter vehicle LIDAR systems:
phase locking the plurality of intra vehicle LIDAR systems, wherein the phase locking comprises directing a plurality of lasers of the intra vehicle LIDAR systems to fire in different directions, respectively;
executing a field of view reduction for a pair of the inter vehicle LIDAR systems; and
executing a sequence of passive states and active states for each of the intra vehicle LIDAR systems and each of the inter vehicle LIDAR systems.

18. The method of claim 17, wherein a pair of inter vehicle LIDAR systems are configured to mutually ignore received return signals when the pair of inter vehicle LIDAR systems are firing laser beams at each other within a field of view threshold.

19. The method of claim 17, wherein each of the inter vehicle LIDAR systems comprises a respective plurality of lasers, the method further comprising for each of the intra vehicle LIDAR systems and the inter vehicle LIDAR systems:
performing, by each LIDAR system, operations including:
receiving, during a passive state, a passive return comprising one or more first optical returns from one or more optical sources other than the plurality of lasers;
receiving, during an active state, an active return comprising one or more second optical returns corresponding to a laser firing of at least one laser of the each LIDAR system and one or more third optical returns from the other optical sources;
comparing a passive electrical signal generated based on the passive return and an active electrical signal generated based on the active return; and
based on the comparing of the passive electrical signal and the active electrical signal, removing, from the active electrical signal, at least a portion of interference corresponding to the one or more third optical returns from the other optical sources.

20. The method of claim 1, wherein the operations further include:
identifying the first optical returns as being from one or more optical sources other than the plurality of lasers based on the first optical returns being received during the passive state.

21. The system of claim 14, wherein
to remove, from the active signal, at least a portion of interference corresponding to the one or more third optical returns from the other optical sources comprises to remove, from the active signal, at least a portion of interference corresponding to the one or more peaks of the one or more third optical returns from the other optical sources.

* * * * *